US012591059B2

(12) United States Patent     (10) Patent No.:   US 12,591,059 B2

Noguchi      (45) Date of Patent:    Mar. 31, 2026

(54) OPTICAL RANGING DEVICE AND OPTICAL RANGING METHOD

(71) Applicant: NEC Corporation, Tokyo (JP)

(72) Inventor: Hidemi Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 993 days.

(21) Appl. No.: 17/639,402

(22) PCT Filed: Sep. 4, 2019

(86) PCT No.: PCT/JP2019/034686

§ 371 (c)(1),
(2) Date: Mar. 1, 2022

(87) PCT Pub. No.: WO2021/044534

PCT Pub. Date: Mar. 11, 2021

(65) Prior Publication Data

US 2022/0326380 A1     Oct. 13, 2022

(51) Int. Cl.
*G01S 17/10*      (2020.01)
*G01S 7/481*      (2006.01)
*G01S 7/486*      (2020.01)

(52) U.S. Cl.
CPC ............ *G01S 17/10* (2013.01); *G01S 7/4814* (2013.01); *G01S 7/486* (2013.01)

(58) Field of Classification Search
None
See application file for complete search history.

(56) References Cited

U.S. PATENT DOCUMENTS

| | | | |
|---|---|---|---|
| 8,179,521 B2 | 5/2012 | Valla et al. | |
| 2004/0222366 A1* | 11/2004 | Frick | G01S 17/931 |
| | | | 250/236 |
| 2011/0098970 A1* | 4/2011 | Hug | G01F 23/292 |
| | | | 702/158 |
| 2014/0160461 A1 | 6/2014 | Van Der Tempel et al. | |
| 2019/0011558 A1* | 1/2019 | Crouch | G08G 1/16 |

(Continued)

FOREIGN PATENT DOCUMENTS

| | | |
|---|---|---|
| JP | S60-244881 A | 12/1985 |
| JP | 2014-522979 A | 9/2014 |

(Continued)

OTHER PUBLICATIONS

Extended European Search Report for EP Application No. 19943964.7, dated on Jul. 29, 2022.

(Continued)

*Primary Examiner* — Hovhannes Baghdasaryan
(74) *Attorney, Agent, or Firm* — NEC-IPC

(57) ABSTRACT

An optical ranging device (10) according to the present disclosure includes a light pulse generation unit (11) that generates a light pulse with a phase change point between a first phase modulation portion and a second phase modulation portion, a light-transmitting unit (12) that transmits the generated light pulse, a light-receiving unit (13) that receives a light pulse reflected from a measurement object by the transmitted light pulse, and a distance calculation unit (14) that calculates a distance to the measurement object, based on a phase change point of the transmitted light pulse and a phase change point of the received light pulse.

19 Claims, 27 Drawing Sheets

(56)　　　　　　References Cited

U.S. PATENT DOCUMENTS

| | | | | |
|---|---|---|---|---|
| 2019/0120961 A1 * | 4/2019 | Marra | .................. | G01S 7/4913 |
| 2021/0072383 A1 * | 3/2021 | Noguchi | ................ | G01S 17/34 |

FOREIGN PATENT DOCUMENTS

| | | | |
|---|---|---|---|
| JP | 2015-161530 | A | 9/2015 |
| JP | 2018-059828 | A | 4/2018 |
| WO | 2003/100458 | A1 | 12/2003 |
| WO | 2019/116549 | A1 | 6/2019 |

OTHER PUBLICATIONS

International Search Report for PCT Application No. PCT/JP2019/034686, malled on Dec. 3, 2019.

* cited by examiner

Fig. 1

PHASE VECTOR OF REGION #1 (0deg)

PHASE VECTOR OF REGION #2 (180deg)

START

GENERATE TRANSMISSION LIGHT PULSE BY MODULATION USING POSITIVE/NEGATIVE FREQUENCY OFFSET ⟋ S201

TRANSMIT RANGING SIGNAL LIGHT ⟋ S202

RECEIVE REFLECTED LIGHT ⟋ S203

EXTRACT PHASE CHANGE POINT FROM PHASE INCREASING/DECREASING TENDENCY OF RECEPTION LIGHT PULSE ⟋ S204

CALCULATE DISTANCE, BASED ON TIME OF PHASE CHANGE POINT ⟋ S205

END

PHASE VECTOR OF REGION #1 (+f1)

PHASE VECTOR OF REGION #2 (-f1)

OPTICAL RANGING DEVICE AND OPTICAL RANGING METHOD

This application is a National Stage Entry of PCT/JP2019/034686 filed on Sep. 4, 2019, the contents of all of which are incorporated herein by reference, in their entirety.

TECHNICAL FIELD

The present invention relates to an optical ranging device and an optical ranging method.

BACKGROUND ART

Optical ranging devices (also called light detection and ranging: LiDAR) that measure a distance to an object by using light are known. Since the optical ranging device can acquire distances of objects in a wide range remotely, the optical ranging device is used for diagnosis and prediction of deterioration of infrastructure equipment by measurement of distortion of bridges and the like, and disaster prevention measures and disaster prediction by measurement of distortion of slopes of mountains and the like. In addition, since the optical ranging device can detect and identify obstacles and suspicious objects over a wide range even in the dark, the optical ranging device is also used for security and monitoring such as airport monitoring. Further, the optical ranging device is beginning to attract attention as a sensor for automatic operation.

As a related art, for example, Patent Literature 1 is known. Patent Literature 1 discloses an optical ranging device of time of flight (ToF) system. The ToF system is a system of measuring a distance of an object, based on a time until reception of a reflected pulse reflected from the object after transmission of a light pulse.

CITATION LIST

Patent Literature

[Patent Literature 1] Published Japanese Translation of PCT International Publication for Patent Application, No. 2014-522979

SUMMARY OF INVENTION

Technical Problem

As described above, in the related optical ranging device, a distance of various objects is measured by employing the ToF system. However, the related art has a problem that it is difficult to measure a distance with high accuracy.

In view of the above problem, an object of the present disclosure is to provide an optical ranging device and an optical ranging method that are capable of improving ranging accuracy.

Solution to Problem

An optical ranging device according to the present disclosure includes: a light pulse generation means for generating a light pulse with a phase change point between a first phase modulation portion and a second phase modulation portion; a light-transmitting means for transmitting the generated light pulse; a light-receiving means for receiving a light pulse reflected from a measurement object by the transmitted light pulse; and a distance calculation means for calculating a distance to the measurement object, based on a phase change point of the transmitted light pulse and a phase change point of the received light pulse.

An optical ranging method according to the present disclosure includes: generating a light pulse with a phase change point between a first phase modulation portion and a second phase modulation portion; transmitting the generated light pulse; receiving a light pulse reflected from a measurement object by the transmitted light pulse; and calculating a distance to the measurement object, based on a phase change point of the transmitted light pulse and a phase change point of the received light pulse.

Advantageous Effects of Invention

According to the present disclosure, it is possible to provide an optical ranging device and an optical ranging method that are capable of improving ranging accuracy.

BRIEF DESCRIPTION OF DRAWINGS

FIG. 1 is a diagram for explaining a ranging principle of the ToF system.

DESCRIPTION OF EMBODIMENTS

Figure 2:
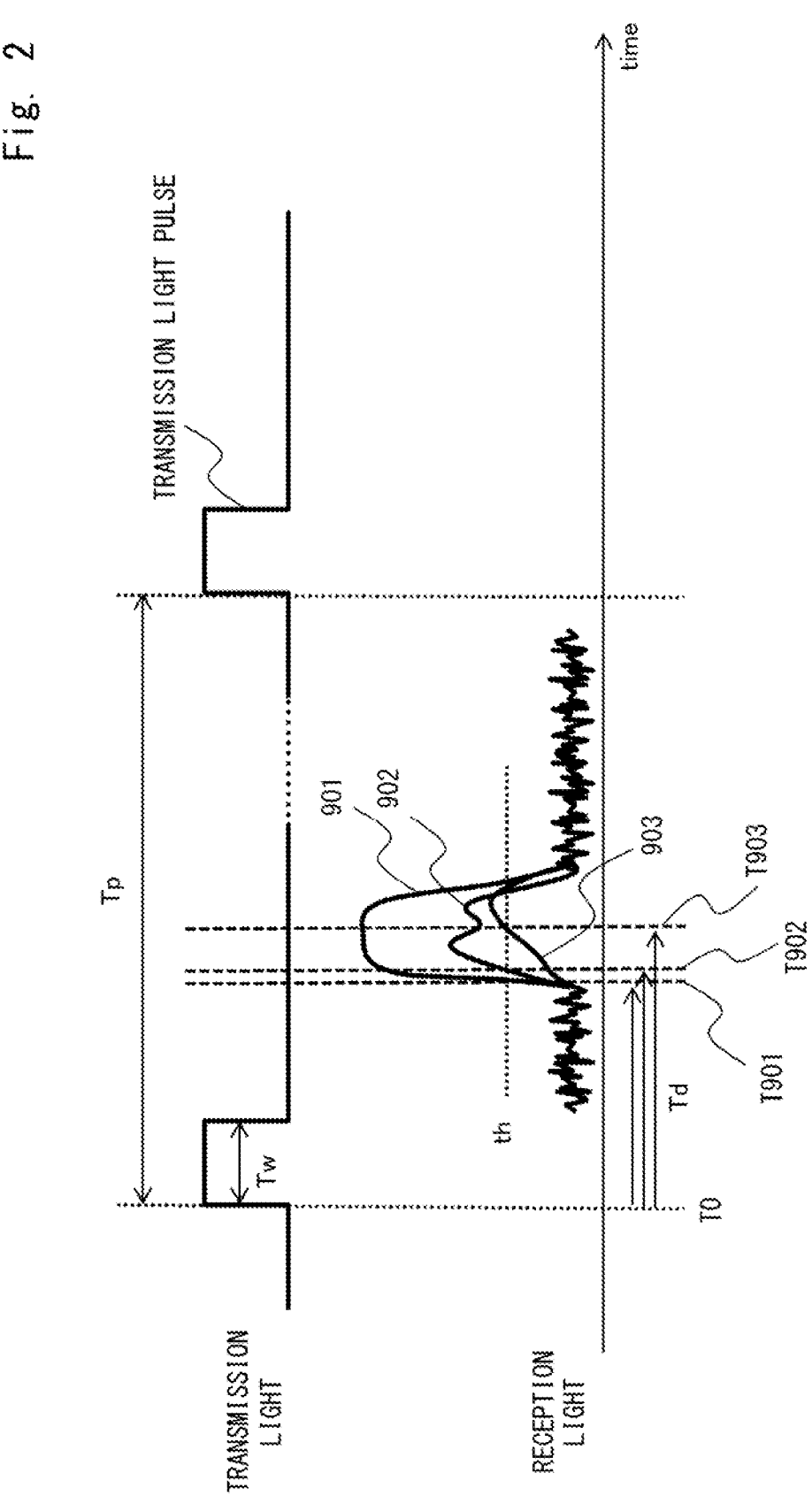
FIG. 2 is a timing chart illustrating a transmission/reception signal in the related art.

Example embodiments will be described below with reference to drawings. In each of the drawings, the same elements are denoted by the same reference numerals, and a repetitive description thereof is omitted as necessary. Note that arrows attached to configuration diagrams (block diagrams) are illustrative examples and do not limit types or directions of signals.

Examination of Example Embodiments

Figure 1:
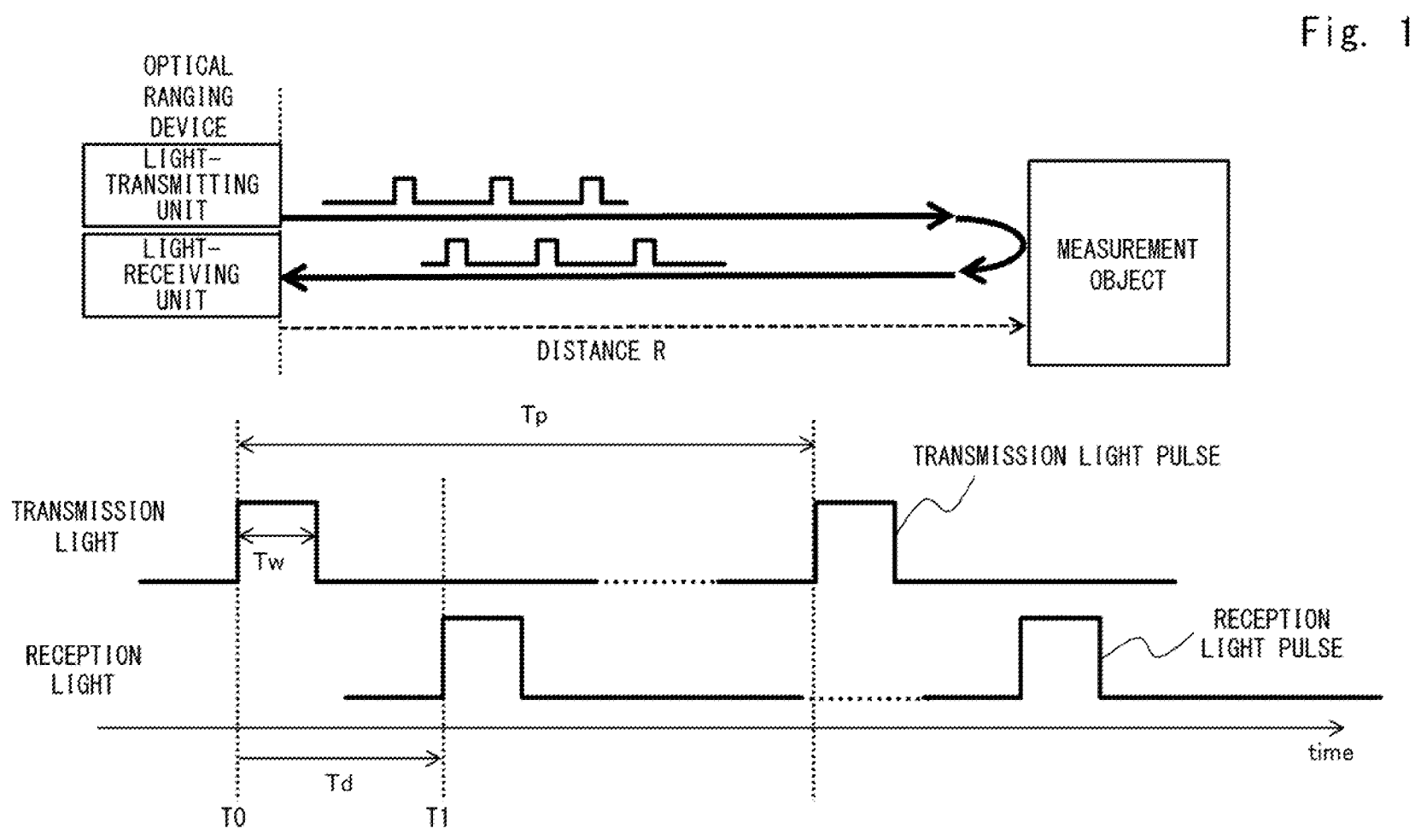

FIG. 1 illustrates a ranging principle of a ToF system. As illustrated in FIG. 1, in the ToF system, the optical ranging device transmits a transmission light pulse, receives reflected light that is reflected from a measurement object, and measures a distance R from the optical ranging device to the measurement object, based on a transmission time of the transmission light pulse and an arrival time (a reception time) of the reception light pulse included in the reflected light.

For example, the optical ranging device transmits a transmission light pulse having a pulse width Tw in a pulse period Tp. The pulse period and the pulse width are set according to measurement application, performance of the optical ranging device, and the like. Assuming that a return pulse delay time from a rising time T0 of the transmission light pulse to a rising time T1 of the reception light pulse is Td, the distance R is acquired by the following equation (1). Herein, C is a speed of light, and the return pulse delay time Td is a delay time of about 6.6 ns/m.

[Equation 1]

$$R = \frac{CT_d}{2} \tag{1}$$

FIG. 2 illustrates an example of a light pulse actually transmitted and received in the related art. As illustrated in FIG. 2, the reception light pulse actually received causes noise and distortion depending on a state of a reflection surface of the measurement object, a measurement environment, and the like. Although a light intensity of the reception light pulse and that of the transmission light pulse are almost the same for easy understanding, in an actual measurement environment, the intensity of the reception light pulse is attenuated to a greater extent than the intensity of the transmission light pulse. The same applies to the following drawings.

In the example of FIG. 2, a reception light pulse 901 is an example in which distortion of a waveform is small, the light intensity is large, and rising of the pulse is steep. A reception light pulse 902 is an example in which a waveform is distorted more than that of the reception light pulse 901 and has two convex portions, and the light intensity is about half of that of the reception light pulse 901, and the rising of the pulse is more gradual than that of the reception light pulse 901. A reception light pulse 903 is an example in which a waveform is distorted more than that of the reception light pulse 902, the light intensity is about ⅓ of that of the reception light pulse 901, and the rising of the pulse is further more gradual than that of the reception light pulse 902.

In the related art, the arrival time of the reception light pulse is detected by a threshold value th. When the threshold value th is used as a reference of the arrival time, an arrival time of the reception light pulse 901 is T901, an arrival time of the reception light pulse 902 is T902 delayed from T901, and an arrival time of the reception light pulse 903 is T903 further delayed from T902. Then, since the return pulse delay time Td changes due to this variation in arrival time, an error occurs in the acquired distance. In other words, simply setting the threshold value in order to detect the reception light pulse causes a variation in arrival determination time depending on the waveform of the reception light pulse, which results in a ranging error. Therefore, in a method of detecting the intensity of the light pulse as in the related art, it is vulnerable to noise and waveform distortion, and the ranging error is large.

As described above, in the related art, there is a problem that it is difficult to suppress the ranging error in the optical ranging device of the ToF system that measures a delay difference between the transmission light pulse irradiated to the measurement object and the reception light pulse reflected from the measurement object. In other words, in the related art, when an intensity waveform of the reception light pulse is disturbed by an influence such as a reflection condition of the measurement object or noise, variation occurs in determination of the arrival time, which makes it difficult to accurately measure the delay time, and therefore, it is impossible to suppress the ranging error. Therefore, in the following example embodiment, it is possible to more accurately measure the arrival time of a reception light pulse on which waveform distortion and noise are superimposed.

Outline of Example Embodiments

Figure 3:
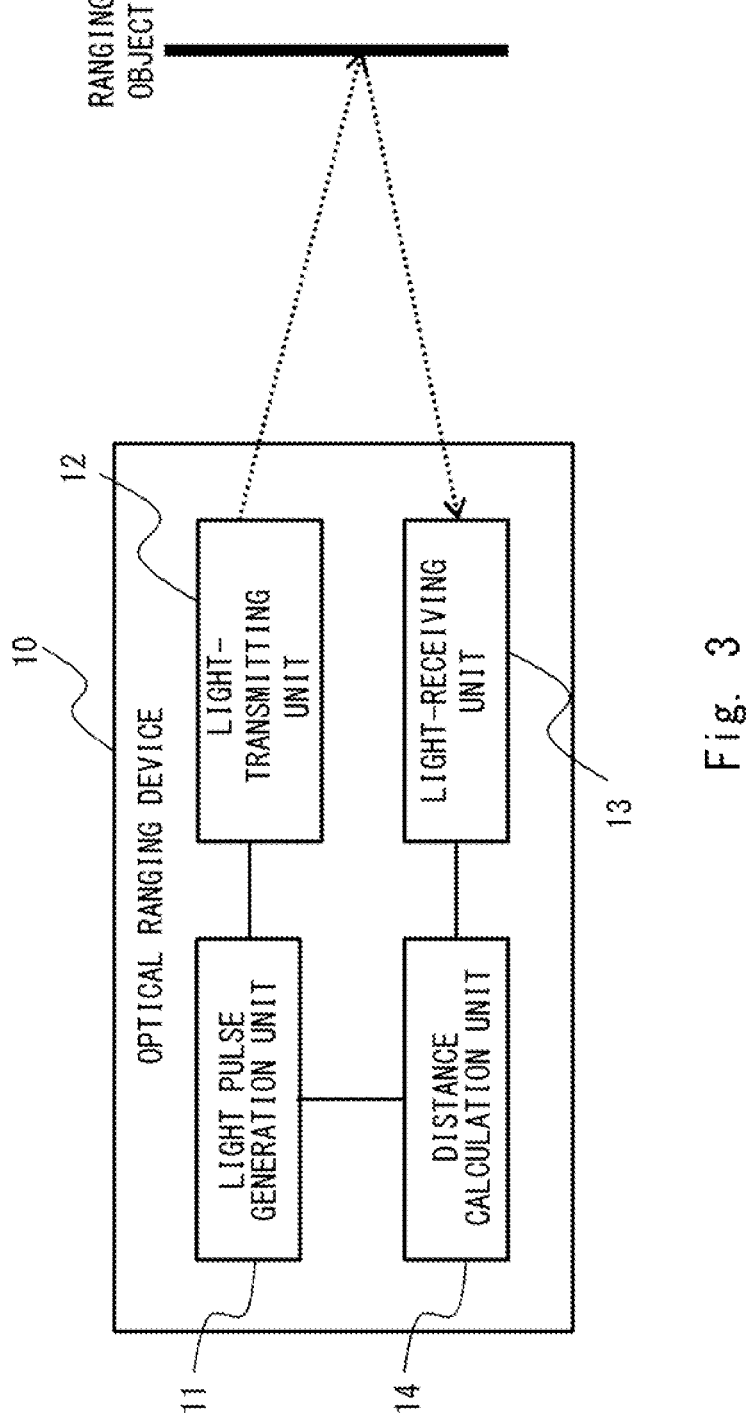
FIG. 3 is a configuration diagram illustrating an outline of an optical ranging device according to an example embodiment.

FIG. 3 illustrates an outline of an optical ranging device according to an example embodiment. As illustrated in FIG. 3, an optical ranging device 10 according to the example embodiment includes a light pulse generation unit 11, a light-transmitting unit 12, a light-receiving unit 13, and a distance calculation unit 14.

The light pulse generation unit 11 generates a light pulse (transmission light pulse) having a phase change point between a first phase modulation portion and a second phase modulation portion. The light-transmitting unit 12 transmits the light pulse generated by the light pulse generation unit 11. The light-receiving unit 13 receives a light pulse (reception light pulse) reflected from a measurement object by the light pulse transmitted by the light-transmitting unit 12. The distance calculation unit 14 calculates a distance from the optical ranging device 10 to the measurement object, based on a phase change point of the transmitted light pulse and a phase change point of the received light pulse.

In this manner, by transmitting and receiving a light pulse having a phase change point, and calculating the distance of the measurement object, based on the phase change point of the transmission light pulse and the phase change point of the reception light pulse, it is possible to suppress the ranging error due to noise or waveform distortion of the reception light pulse, and therefore, it is possible to improve the ranging accuracy. In other words, since phase information of signals is resistant to noise in an amplitude (intensity) direction, it is possible to measure the time with high accuracy as compared with the ToF time measurement based on intensity information to be used in the related art, and it is possible to improve the ranging accuracy.

First Example Embodiment

Hereinafter, a first example embodiment will be described with reference to drawings. In the present example embodiment, phase modulation is applied to a transmission light pulse, and a transition of the phase is used for timing extraction of the reception light pulse. In particular, the transmission light pulse is divided into a first half portion and a second half portion on a transmission side, modulated with different phases, and a phase switching time of the first half portion and the second half portion of the reception light pulse is extracted on a reception side, and the extracted time is defined as a ToF time.

Figure 4:
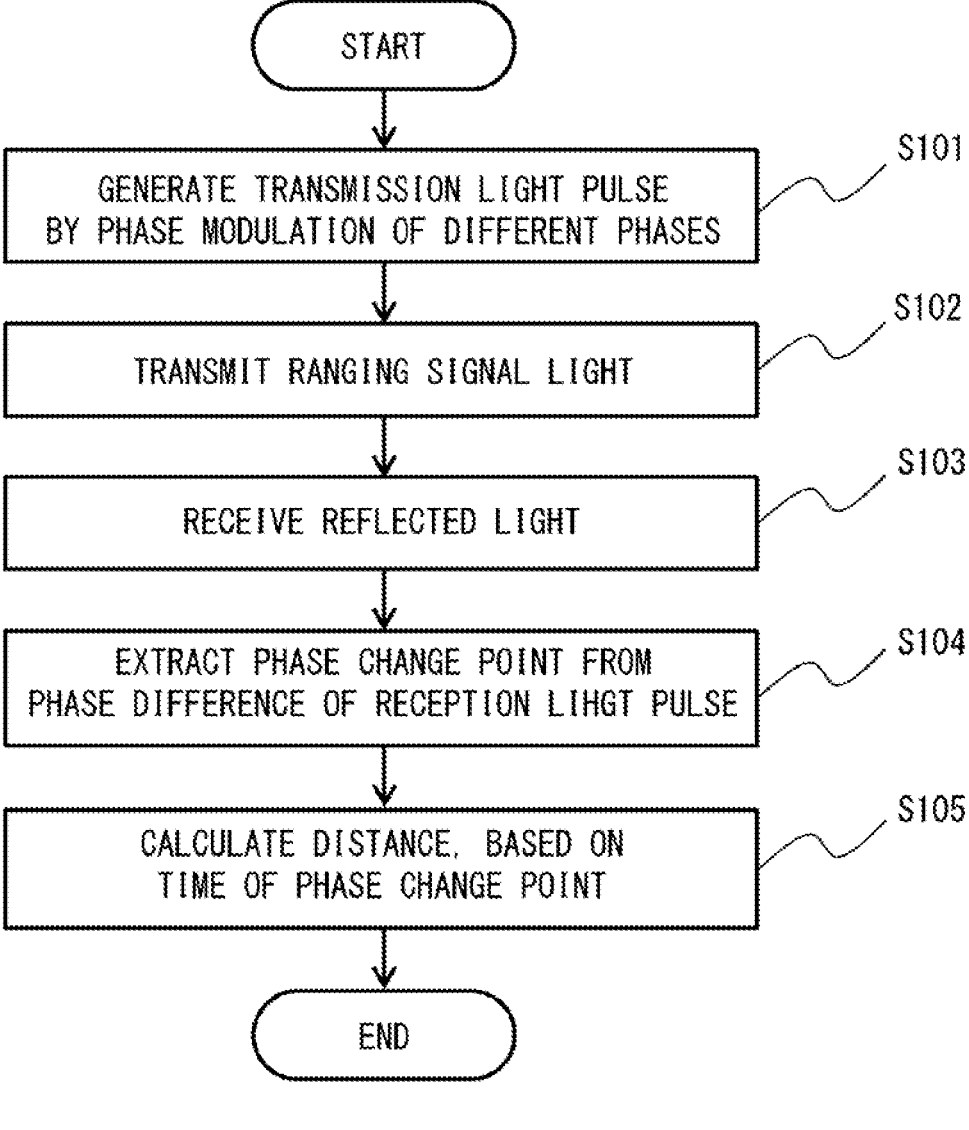
FIG. 4 is a flowchart illustrating an optical ranging method according to a first example embodiment.
Figure 5:
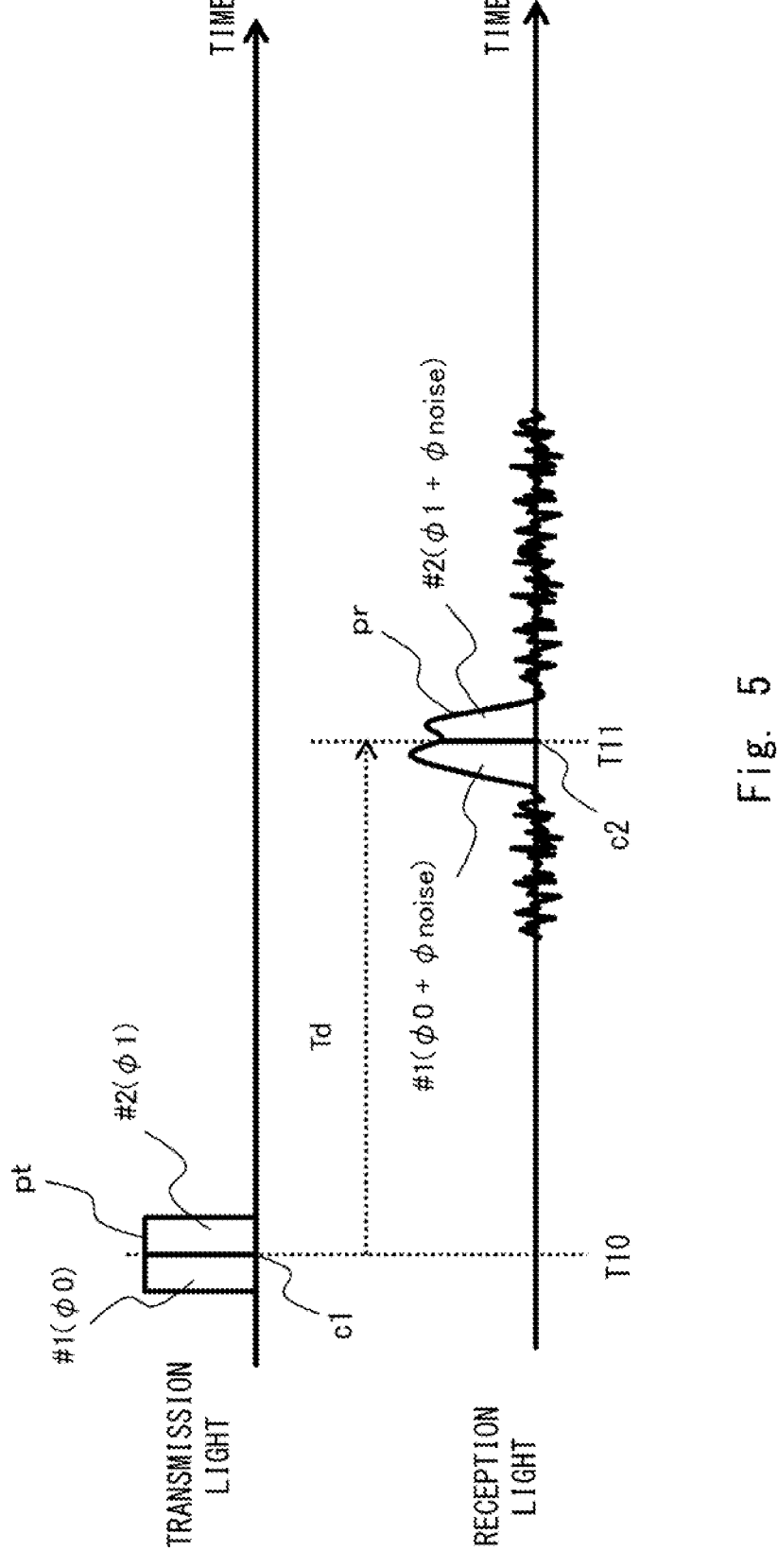
FIG. 5 is a timing chart illustrating an optical ranging method according to the first example embodiment.

FIGS. 4 and 5 illustrate an optical ranging method according to the present example embodiment. As illustrated in FIG. 4, in the present example embodiment, a transmission light pulse is generated by phase modulation of different phases on the transmission side of the optical ranging device (S101), and the generated transmission light pulse is transmitted as ranging signal light (S102). As illustrated in FIG. 5, a transmission light pulse pt is generated by phase modulation of different phases in a region #1 of the first half portion (first phase modulation portion) and a region #2 of the second half portion (first phase modulation portion). For example, in the transmission light pulse pt, an optical phase of the region #1 is $\Phi 0$ (first phase), an optical phase of the region #2 is $\Phi 1$ (second phase different from the first phase), and a point at which the optical phase $\Phi 0$ is switched to optical phase $\Phi 1$ is a phase change point c1.

Subsequently, as illustrated in FIG. 4, on a reception side of the optical ranging device, reflected light from a measurement object is received (S103), a phase change point of the reception light pulse included in the received reflected light is extracted from a phase difference of the reception light pulse (S104), and a distance of the measurement object is calculated based on times of phase change points of the transmission light pulse and the reception light pulse (S105). As illustrated in FIG. 5, a phase change point c2 at which the phase of the region #1 of the first half portion and the phase of the region #2 of the second half portion of a reception light pulse pr are switched is extracted. For example, assuming that an indefinite phase offset due to optical phase noise is $\Phi$noise, the optical phase of the region #1 becomes $\Phi 0+\Phi$noise, and the optical phase of the region #2 becomes $\Phi 1+\psi$noise. The phase change point c2 is extracted from an optical phase difference ($\Phi-\Phi 1$) between the region #1 and the region #2. Further, the distance of the measurement object is acquired from the return pulse delay time Td from a time T10 of the phase change point c1 of the transmission light pulse pt to the time T11 of the phase change point c2 of the reception light pulse pr.

In the reception light pulse, a temporal variation of the phase due to phase fluctuation of a light source occurs, but these temporal variations are gradual. Therefore, in the present example embodiment, by extracting the phase difference ($\Phi 0-\Phi 1$) between the first half portion and the second half portion of the reception light pulse, it is possible to cancel $\Phi$noise due to the phase fluctuation of the light source. In addition, even when the waveform of the reception light pulse is distorted, phase information of light is retained, and therefore, it is resistant to noise in an amplitude direction, and it is possible to suppress variation in the arrival time, and the ranging accuracy is improved.

Figure 6:
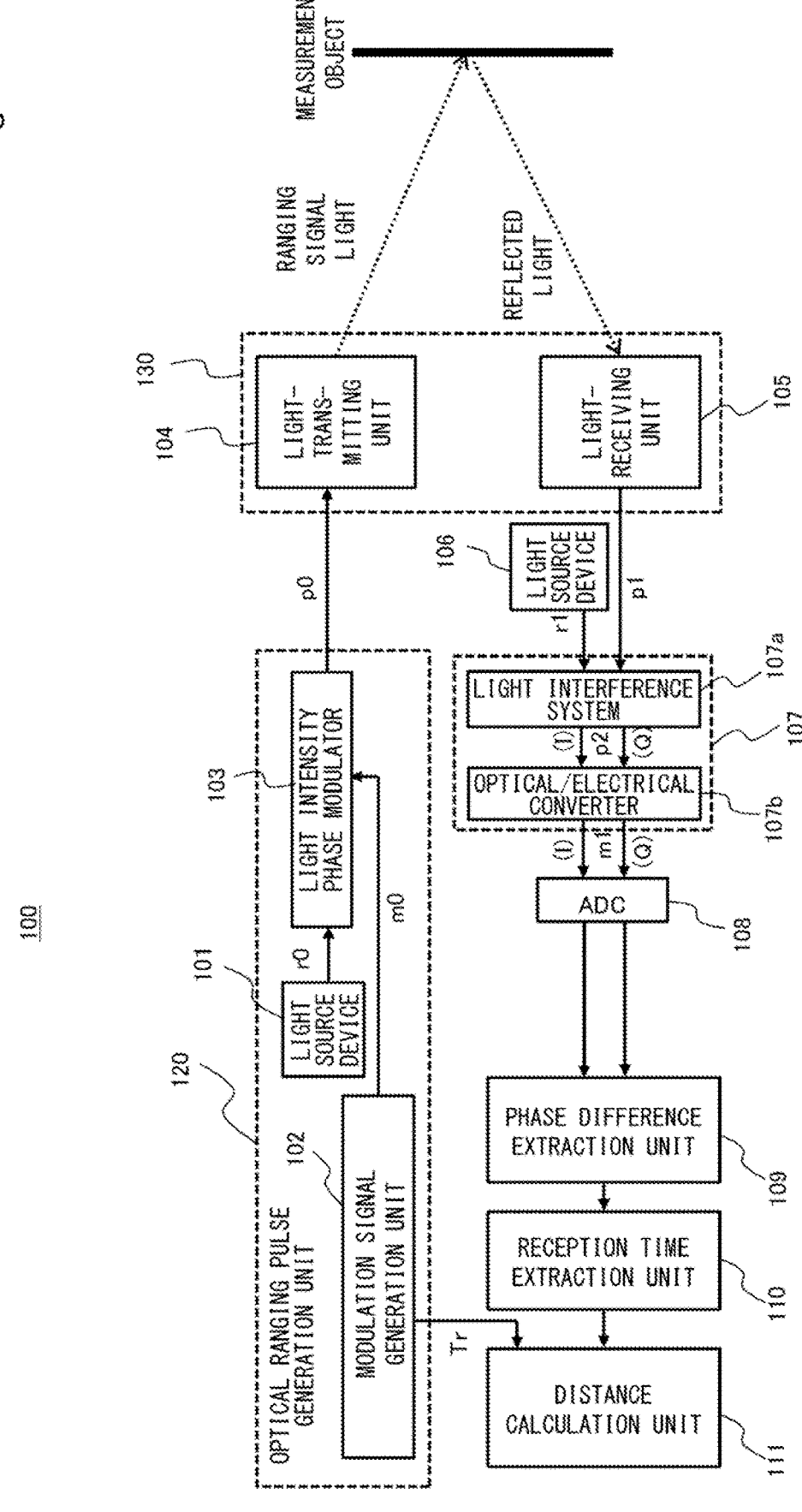
FIG. 6 is a configuration diagram illustrating a configuration example of the optical ranging device according to the first example embodiment.

FIG. 6 illustrates a configuration of the optical ranging device according to the present example embodiment. Note that the configuration of FIG. 6 is an example, and another configuration may be used as long as the optical ranging method according to the present example embodiment can be implemented. For example, other coherent light transmitting/receiving devices may be used.

As illustrated in FIG. 6, an optical ranging device 100 according to the present example embodiment includes a light source device 101, a modulation signal generation unit 102, a light intensity phase modulator 103, a light-transmitting unit 104, a light-receiving unit 105, a light source device 106, a coherent IQ optical receiver 107, an ADC 108, a phase difference extraction unit 109, a reception time extraction unit 110, and a distance calculation unit 111. For example, the light source device 101, the modulation signal generation unit 102, and the light intensity phase modulator 103 constitute an optical ranging pulse generation unit (light pulse generation unit) 120 that generates a light pulse. In addition, the optical ranging pulse generation unit 120 and the light-transmitting unit 104 constitute a transmission unit (transmission side) of the optical ranging device 100, and the light-receiving unit 105, the light source device 106, the coherent IQ optical receiver 107, the ADC 108, the phase difference extraction unit 109, the reception time extraction unit 110, and the distance calculation unit 111 constitute a reception unit (reception side) of the optical ranging device 100.

The light source device 101 is a light source device such as a laser that generates a light source r0 (e.g., a frequency f0) for generating a transmission light pulse. The modulation signal generation unit 102 generates a phase modulation signal m0 for modulating the phase of the first half portion and the phase of the second half portion of the transmission light pulse, which are different from each other. The modulation signal generation unit 102 outputs a transmission trigger signal Tr at a timing at which the phase is switched.

The light intensity phase modulator 103 generates a transmission light pulse acquired by applying intensity modulation and phase modulation to the light source r0, based on the phase modulation signal m0, and outputs a transmission light signal p0 including the transmission light pulse. The light intensity phase modulator 103 is, for example, a Mach-Zehnder (MZ) type optical modulator or an MZ type IQ optical modulator.

Figure 7:
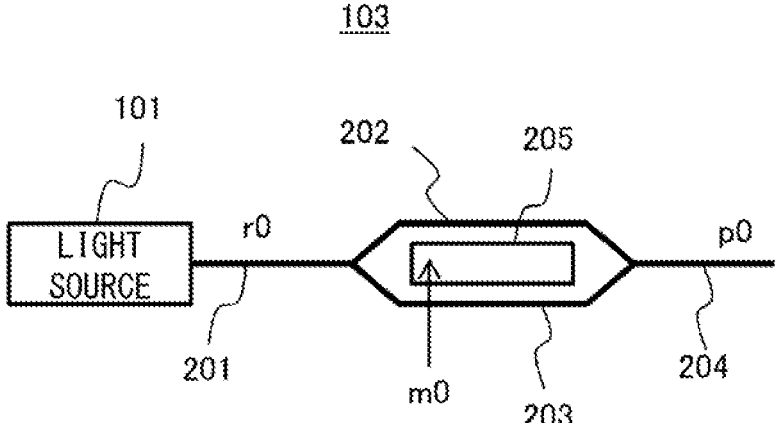
FIG. 7 is a configuration diagram illustrating a configuration example of an optical phase modulator according to the first example embodiment.

FIG. 7 illustrates an example of the light intensity phase modulator 103 according to the present example embodiment. For example, the light intensity phase modulator 103 is an MZ type optical modulator, and includes an arm 202 and an arm 203 which are branch waveguides between an input optical waveguide 201 and an output optical waveguide 204, and a phase modulation electrode 205 between the arm 202 and the arm 203. An optical signal (r0) input to the input optical waveguide 201 is demultiplexed by the arm 202 and the arm 203, and a multiplexed optical signal (p0) is output from the output optical waveguide 204. When the phase modulation signal m0 is input to the phase modulation electrode 205, refractive indices of the arm 202 and the arm 203 change depending on a voltage of the phase modulation signal m0, and the phase of the optical signal output from the output light waveguide 204 changes. When the phases of the optical signals of the arm 202 and the arm 203 are the same, an optical signal strongly combined by interference is output. When the phase of the optical signals of the arm 202 and the arm 203 is 180°, the optical signals are canceled by interference and the output of the optical signals becomes zero.

In FIG. 6, the light-transmitting unit 104 transmits the transmission optical signal p0 including the transmission light pulse as ranging signal light. The light-transmitting unit 104 is a transmission optical system such as a lens, and emits the transmission light signal p0 as parallel light to the measurement object. The light-receiving unit 105 receives the reflected light reflected from the measurement object, and outputs a reception light signal p1 including a reception light pulse. Like the light-transmitting unit 104, the light-receiving unit 105 is a reception optical system such as a lens.

Figure 8:
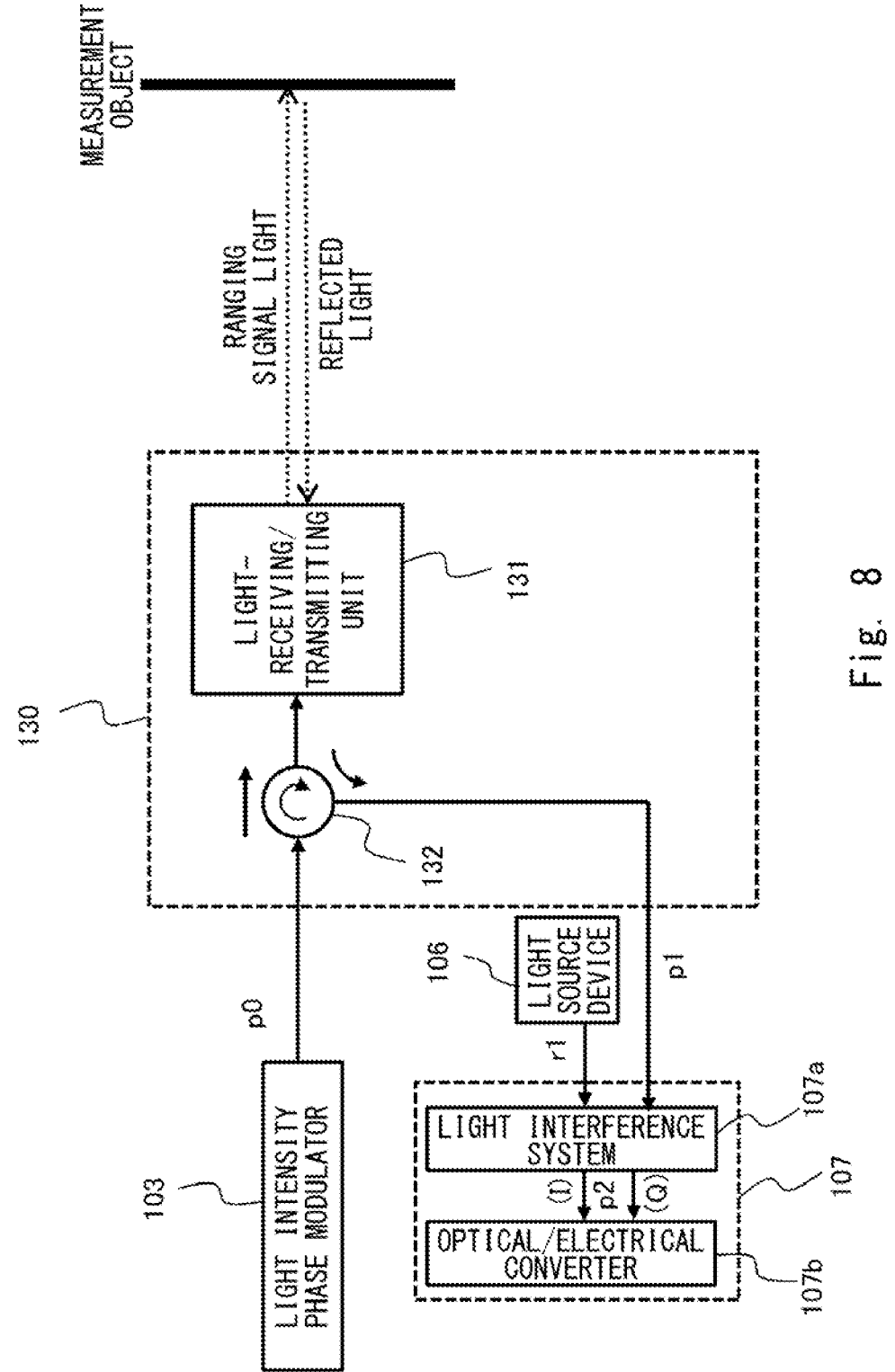
FIG. 8 is a configuration diagram illustrating a configuration example of a light transmission/reception block according to the first example embodiment.

In FIG. 6, a light-transmitting/receiving block 130 including optical systems of the light-transmitting unit 104 and the light-receiving unit 105 is illustrated as an example in which independent optical systems are configured on the transmission side and the reception side, respectively, but the present invention is not limited thereto. For example, as illustrated in FIG. 8, the light-transmitting/receiving block 130 may include a light-transmitting/receiving unit 131 and a circulator 132. Specifically, a transmission signal and a reception signal may be separated by using a circulator by using the same optical system for transmission and reception. In this case, although crosstalk occurs from the transmission side to the reception side due to optical characteristics of the circulator, internal reflection of a lens portion, and the like, since the same optical system is used for transmission and reception, there is an advantage that optical axis adjustment becomes unnecessary.

The light source device 106 is a light source device such as a laser that generates reference light r1 for interfering with the reception light signal p1. The light source device 106 is the same device as the light source device 101 on the transmission side, and the reference light r1 is an optical signal having the same frequency as that of the light source r0 on the transmission side (e.g., f0). Instead of the light source device 106, light of the light source device 101 on the transmission side may be branched to the reference light r1.

The coherent IQ optical receiver 107 interferes the reception light signal p1 including the reception light pulse with the reference light r1, and generates an IQ reception signal m1. The IQ reception signal m1 includes a signal (m1(I)) of an in-phase component and a signal (m1(Q)) of a quadrature component with respect to the reference light r1. The coherent IQ optical receiver 107 includes a light interference system 107a and an optical/electrical converter 107b. The light interference system 107a interferes the reception light signal p1 with the reference light r1 and generates an interference light signal p2 including a light signal p2(I) of the in-phase component and a light signal p2(Q) of the quadrature component. The optical/electrical converter 107b photoelectrically converts the in-phase component and the quadrature component of the interference light signal p2 and generates an IQ reception signal m1. As the coherent IQ optical receiver 107, a coherent IQ optical receiver composed of a 90° hybrid mixer and a balanced receiver used in general digital coherent optical communication can be used, and thus, a signal transmitted from the transmission side can be demodulated on the reception side, based on the same principle as optical communication.

The ADC 108 is an analog-to-digital converter (AD converter) that performs AD conversion on the IQ reception signal m1 subjected to photoelectric conversion. The phase difference extraction unit (phase change point detection unit) 109 extracts a phase difference of the reception light pulse, based on the IQ reception signal m1 subjected to AD conversion, and detects a phase change point from the phase difference. Herein, the phase difference extraction unit 109 detects a phase change point, based on a change in the signal intensity of the IQ reception signal m1. The reception time extraction unit 110 identifies a reception time (an arrival time) of the reception light pulse, based on a time of the detected phase change point of the reception light pulse. The distance calculation unit 111 calculates a distance of the measurement object from a time of a phase change point of the transmission light pulse and the time of the phase change point of the reception light pulse. The distance calculation unit 111 calculates the distance of the measurement object, based on a time difference between the transmission time of the transmission trigger signal Tr indicating a timing of the phase change point of the transmission light pulse and the reception time of the phase change point of the reception light pulse.

Figure 9:
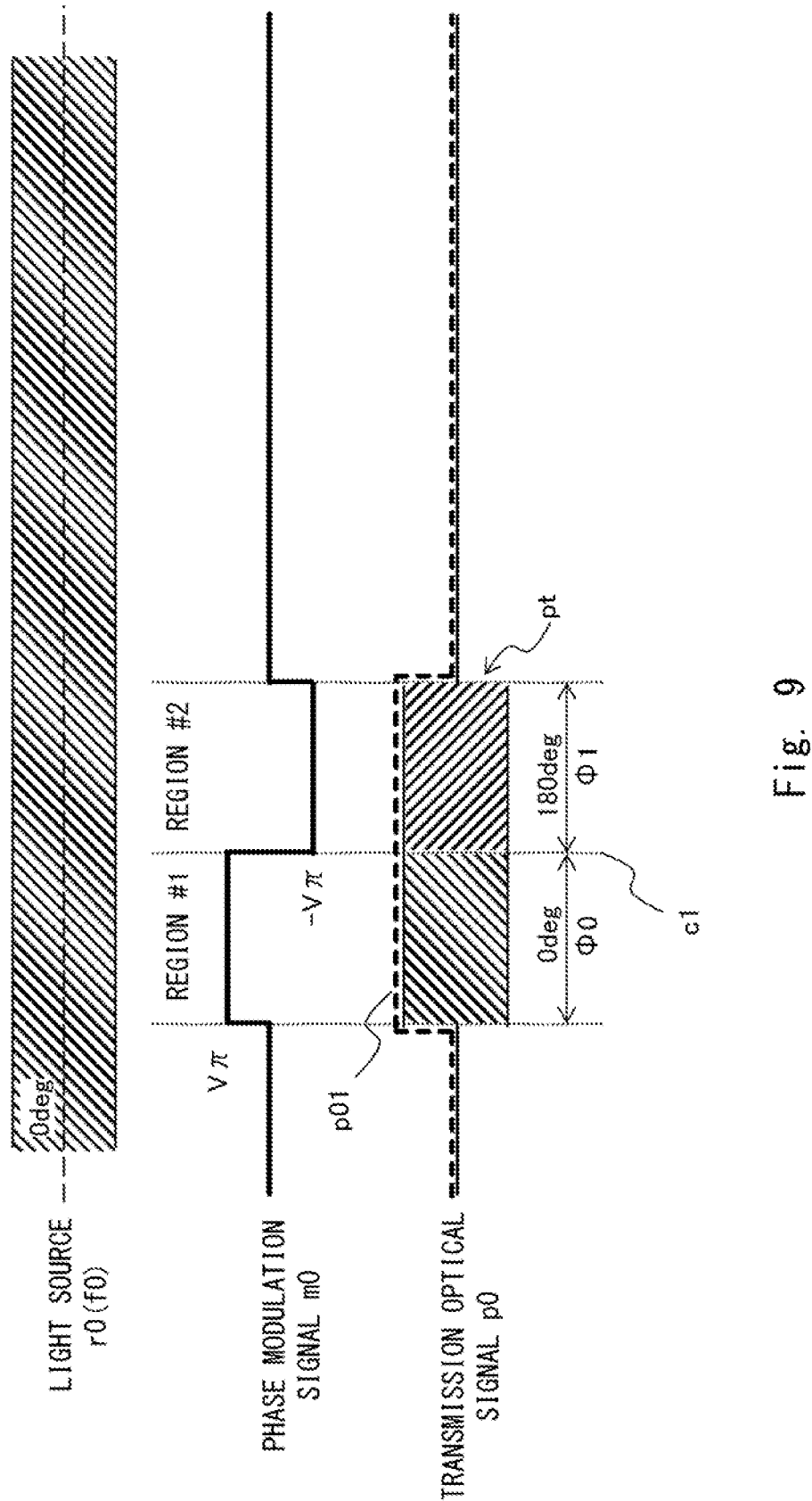
FIG. 9 is a timing chart illustrating a transmission signal according to the first example embodiment.

FIG. 9 illustrates a specific example of a signal on the transmission side in the optical ranging device 100 of FIG. 6. As illustrated in FIG. 9, the light source device 101 on the transmission side generates a light source r0 having an optical frequency f0. Note that FIG. 9 schematically illustrates a light signal having an optical frequency f0 for simplification, and the same applies to the following drawings.

As illustrated in FIG. 9, the modulation signal generation unit 102 generates a phase modulation signal m0 having different levels in the region #1 and the region #2. In this example, a voltage of the region #1 is Vπ and a voltage of the region #2 is −Vπ. For example, Vπ is a voltage for generating an optical signal having the same phase (phase 0°) as that of the light source r0, and −Vπ is a voltage for generating an optical signal having the opposite phase (phase) 180° to that of the light source r0. Portions other than the regions #1 and #2 are intermediate voltages of Vπ and −Vπ. In the case of the light intensity phase modulator 103 of FIG. 7, Vπ is a voltage at which the phase of the optical signals of the arm 202 and the arm 203 is 0°, −Vπ is a voltage at which the phase of the optical signal of the arm 202 is 180° and the phase of the optical signal of the arm 203 is −180°, and the intermediate voltage is a voltage at which the phase of the optical signal of the arm 202 is 90° and the phase of the optical signal of the arm 203 is −90°. In other words, Vπ is a voltage at which the optical signals of both arms are reinforced as a signal having a phase of 0°, −Vπ is a voltage at which the optical signals of both arms are reinforced as a signal having a phase of 180° (=−180°), and an intermediate potential is a voltage at which the optical signals of both arms are cancelled at 90° and −90°.

Figure 10:
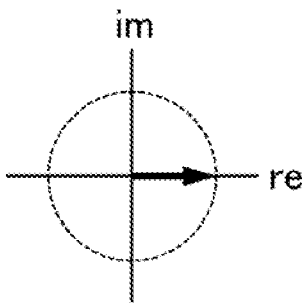
FIG. 10 is a diagram illustrating a phase vector of a transmission signal according to the first example embodiment.
Figure 11:
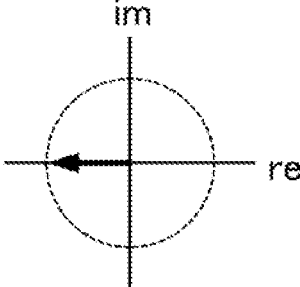
FIG. 11 is a diagram illustrating a phase vector of a transmission signal according to the first example embodiment.

As illustrated in FIG. 9, the light intensity phase modulator 103 generates a transmission light pulse pt in accordance with the phase modulation signal m0. A portion of the region #1 of the transmission light pulse pt becomes an optical signal having a phase of 0° (Φ0) according to the voltage Vπ of the region #1 of the phase modulation signal m0. A phase vector of the region #1 is a vector in the 0° direction on the real axis as illustrated in FIG. 10. A portion of the region #2 of the transmission light pulse pt becomes an optical signal (inverted signal of the region #1) having a phase of 180° (Φ1) according to the voltage −Vπ of the region #2 of the phase modulation signal m0. A phase vector of the region #2 is a vector in the direction of 180° on the real axis as illustrated in FIG. 11. At a boundary between the region #1 and the region #2, a point at which the phase is switched and inverted becomes the phase change point c1. The optical signal is not output in the portions other than the region #1 and the region #2 according to the intermediate voltage of the phase modulation signal m0. The light-transmitting unit 104 transmits a transmission optical signal p0 including the transmission light pulse pt. The light intensity of the transmission optical signal p0 has a pulse shape as indicated by a broken line of p01. Herein, as an example, the phase of the region #1 is set to 0° and the phase of the region #2 is set to 180°, but any other phase may be used as long as the phases of the region #1 and the region #2 are different from each other.

Figure 12:
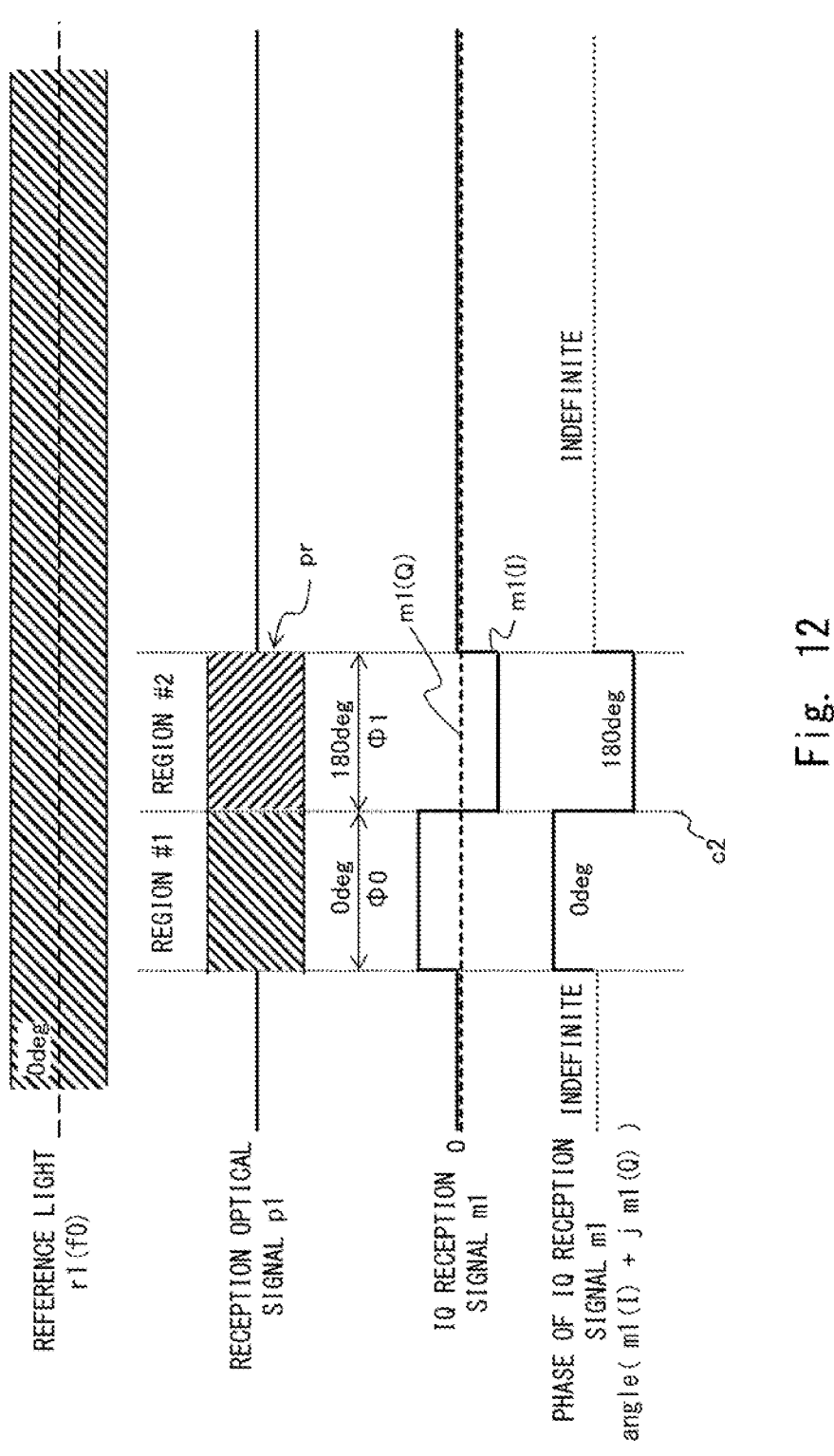
FIG. 12 is a timing chart illustrating a reception signal according to the first example embodiment.

FIG. 12 illustrates a specific example of a signal on the reception side in the optical ranging device 100 of FIG. 6. As illustrated in FIG. 12, the light source device 106 on the reception side generates the reference light r1 having the same optical frequency f0 as that on the transmission side. Alternatively, as described above, the light of the light source device 101 on the transmission side may be branched to the reference light r1.

As illustrated in FIG. 12, the light-receiving unit 105 receives the reception light signal p1 including the reception light pulse pr. Herein, for the sake of simplification of description, a case where an ideal reception light pulse having the same phase as the transmission signal is received is illustrated. The portion of the region #1 of the reception light pulse pr is an optical signal of a phase Φ0 (0°), and the portion of the region #2 of the reception light pulse pr is an optical signal of a phase Φ1 (180°).

As illustrated in FIG. 12, the optical interference system 107a of the coherent IQ optical receiver 107 generates an IQ reception signal m1 by causing interference between the reception light signal p1 and the reference light r1 in accordance with a general coherent IQ reception principle used in digital coherent optical communication. Herein, since the case where an ideal reception signal is received is illustrated, as for the in-phase component m1(I) of the reception signal, output amplitudes of the region #1 and the region #2 change. Since the quadrature component of the reception signal does not exist, m1(Q) is not output. At this time, when the IQ reception signal m1 is expressed as m1=m1(I)+jm1(Q) (j is an imaginary unit) as a complex signal, the phase of the complex signal can be calculated as atan (m1(Q)/m1(I)), and a phase signal of 0° in the region #1 and 180° in the region #2 can be acquired as illustrated in the bottom of FIG. 12. Otherwise, since the reception signal is no signal, the phase is indefinite. As described above, a point at which the phase of the IQ reception signal m1 greatly changes from 0° to 180° at the boundary between the region #1 and the region #2 becomes the phase change point c2.

Although FIG. 12 illustrates a timing chart of an ideal reception signal, actually, a phase relationship (relative phase) between the reception signal and the reference light r1 is indefinite depending on phase noise of the light source, a distance to the reflection object, and the like. This phase difference is expressed as Φnoise. In such a case, an in-phase component and a quadrature component exist in the reception light signal, and both components of m1(I) and m1(Q) are output according to the principle of the coherent IQ optical receiver, but again, the phase information of the IQ reception signal m1 can be calculated as atan(m1(Q)/m1(I)). At this time, Φnoise fluctuates due to light source phase noise or the like, but since the time constant is large and gradually fluctuates (e.g., a kHz order), when the pulse width acquired by combining the region #1 and the region #2 is sufficiently short in terms of time, Φnoise can be regarded as constant in the region #1 and the region #2. Therefore, the phase of the IQ reception signal m1 becomes Φ0+Φnoise in the region #1 and Φ1+Φnoise in the region #2, and when the phase difference between the region #1 and the region #2 is acquired, Φnoise is canceled and becomes Φ0−Φ1, and a point at which the phase change of the IQ reception signal m1 changes by 180° can be detected as the phase change point c2.

The phase difference extraction unit 109 extracts the phase difference of the reception light pulse, based on the IQ reception signal m1 illustrated in FIG. 12, and detects a phase change point. For example, a point at which the phase of the IQ reception signal m1 changes more than a predetermined value is detected as the phase change point c2. The distance calculation unit 111 calculates the distance of the measurement object from the time of the phase change point c1 of the transmission light pulse illustrated in FIG. 9 and the time of the phase change point c2 of the reception light pulse illustrated in FIG. 12.

As described above, in the present example embodiment, in the optical ranging device and the optical ranging method of the ToF system, phase modulation is applied to the two regions of the transmission light pulse with different phases and the transmission light pulse is transmitted, phase difference information included in the received reception light pulse is extracted, and the distance of the measurement object is measured by detecting the phase change point. As a result, even when the reception light pulse has noise or large waveform distortion in an amplitude direction, the arrival time can be measured with high accuracy, and the ranging accuracy can be improved.

Although the coherent IQ optical receiver is used on the reception side in the present example embodiment, an optical receiver of a delay detection system used in optical communication can also be used in the same manner. This is an optical receiver capable of detecting a phase difference between a current reception light signal and a reception light signal having a certain delay time by interfering with each other. Using such an optical receiver, by performing appropriate delay detection in such a way that the delay time becomes approximately the same as that of the region #1, the reception light signal of the region #1 and the reception light signal of the region #2 are caused to interfere with each other, and the phase difference can be detected. Thus, the phase change points of the regions #1 and #2 can be extracted.

Second Example Embodiment

Hereinafter, a second example embodiment will be described with reference to the drawings. In the present example embodiment, in the optical ranging device and the optical ranging method according to the first example embodiment, phase modulation is applied to a transmission light pulse by a monotonically increasing phase and a monotonically decreasing phase. The basic configuration and operation are the same as those of the first example embodiment.

Figure 13:
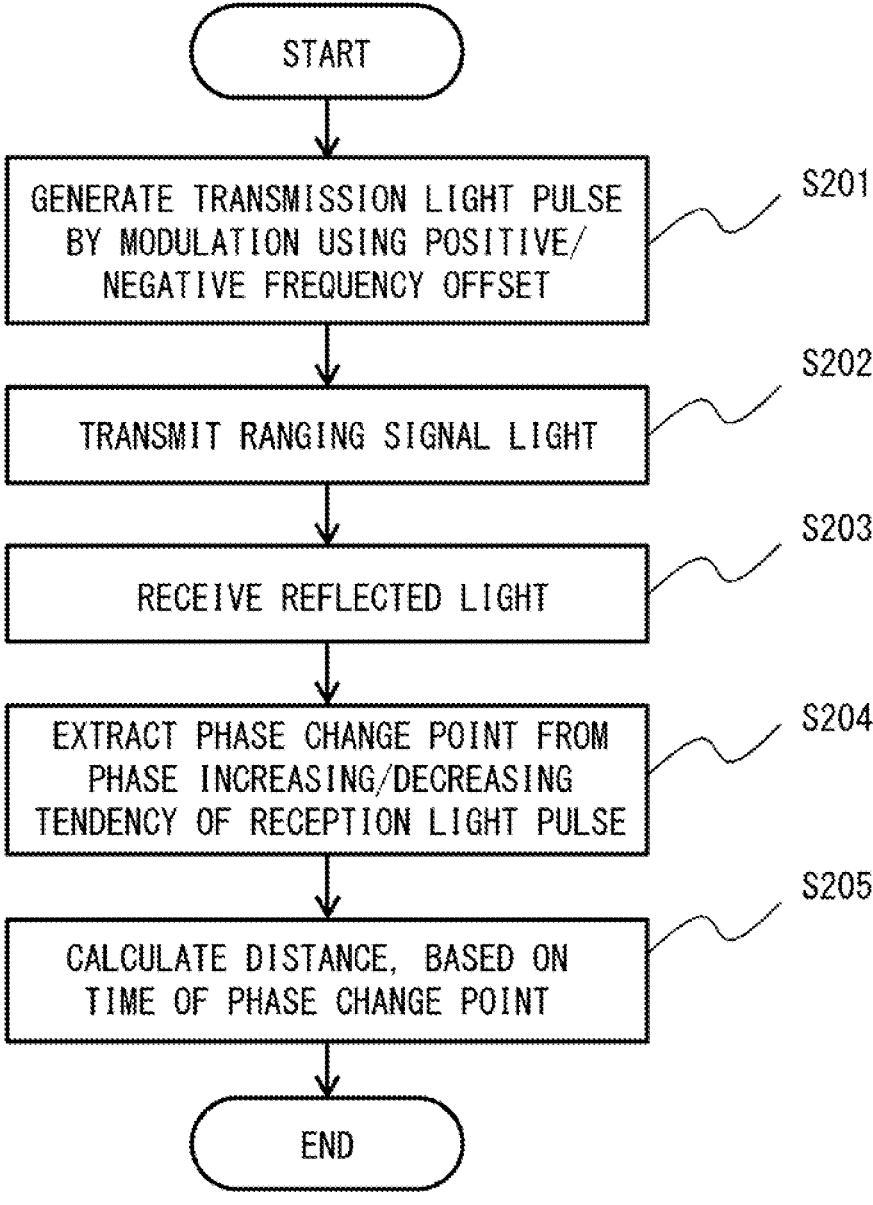
FIG. 13 is a flowchart illustrating an optical ranging method according to a second example embodiment.
Figure 14:
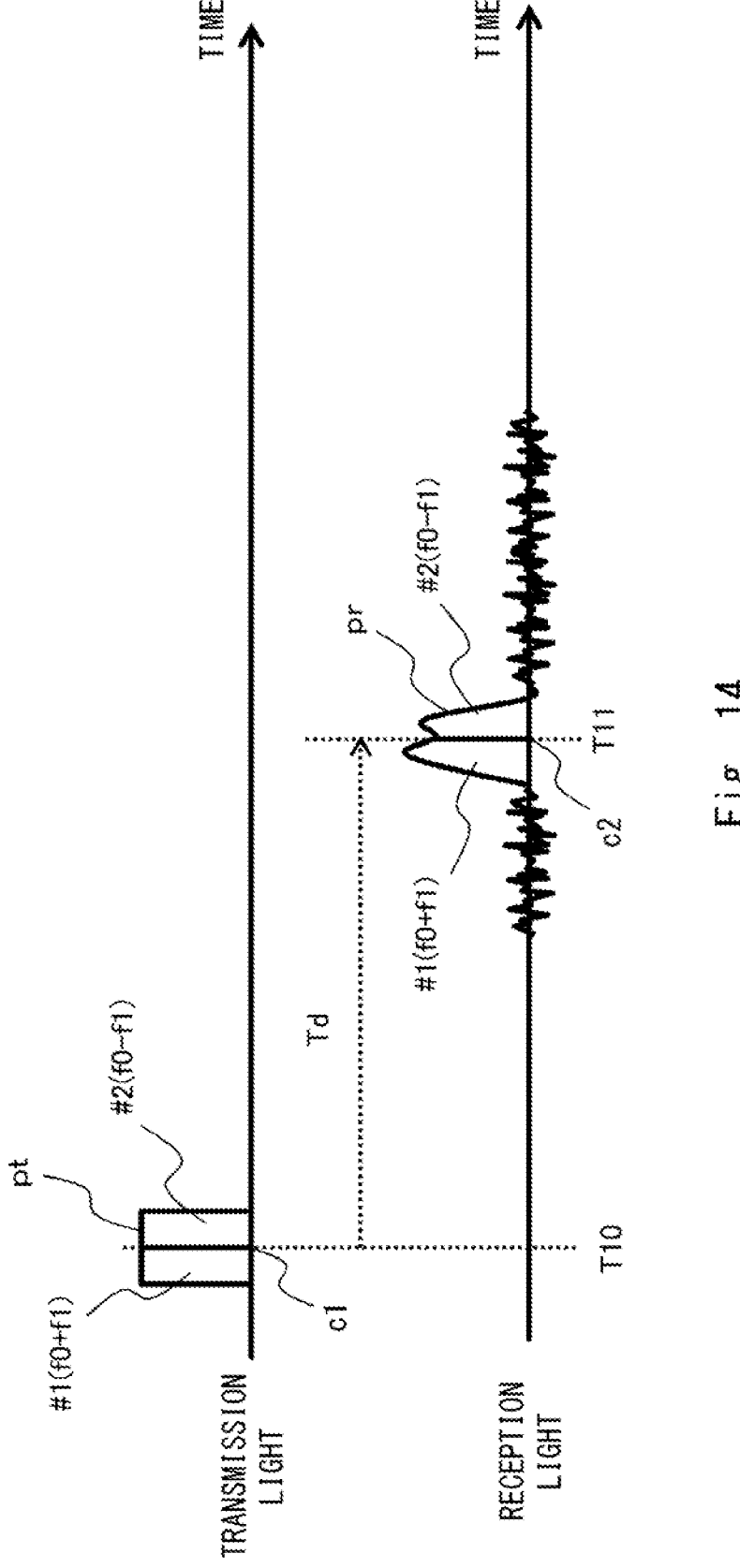
FIG. 14 is a timing chart illustrating an optical ranging method according to the second example embodiment.

FIGS. 13 and 14 illustrate an optical ranging method according to the present example embodiment. As illustrated in FIG. 13, in the present example embodiment, a transmission light pulse is generated by modulation using a positive frequency offset and a negative frequency offset on a transmission side of an optical ranging device (S201), and the generated transmission light pulse is transmitted as ranging signal light (S202). As illustrated in FIG. 14, in a region #1 of the first half portion of a transmission light pulse pt, modulation is applied in such a way that the phase monotonically increases (changes at a first inclination with respect to time) by applying a positive frequency offset (first frequency offset), and in a region #2 of the second half portion of the transmission light pulse pt, modulation is applied in such a way that the phase monotonically decreases (changes at a second inclination with respect to time) by applying a negative frequency offset (second frequency offset). For example, it is assumed that a frequency of reference light (reference frequency) is f0, a frequency offset is f1, an optical frequency of the region #1 is f0+f1, and an optical frequency of the region #2 is f0−f1. In the transmission light pulse pt, a point at which a phase monotonically increasing by the optical frequency f0+f1 is switched to a phase monotonically decreasing by the optical frequency f0−f1 becomes a phase change point c1. A frequency offset f1 is not particularly limited, but is, for example, 100 MHz to 200 MHz.

Subsequently, as illustrated in FIG. 13, on a reception side of the optical ranging device, reflected light from a measurement object is received (S203), a phase change point of the reception light pulse included in the received reflected light is extracted from a phase increase/decrease tendency of the reception light pulse (S204), and a distance of the measurement object is calculated based on times of phase change points of the transmission light pulse and the reception light pulse (S205). As illustrated in FIG. 14, a phase change point c2 at which the increase/decrease tendency (inclination) of phases of the region #1 of the first half portion and the region #2 of the second half portion of a reception light pulse pr are switched is extracted. For example, in the reception light pulse pr, the phase of the region #1 is monotonically increased by the optical frequency f0+f1, the phase of the region #2 is monotonically decreased by the optical frequency f0−f1, and the point at which the phase is switched from the monotonic increase to the monotonic decrease is detected. Further, as in the first example embodiment, a distance of the measurement object is acquired from a time T10 of the phase change point c1 of a transmission light pulse pt and a time T11 of the phase change point c2 of the reception light pulse pr.

In the present example embodiment, even when a signal in the vicinity of a transition between the first half portion and the second half portion of the reception light pulse is disturbed, the transition between the first half and the second half can be predicted from a phase increment of the first half portion and a phase decrement of the second half portion, and therefore, influences of noise and waveform distortion can be further suppressed, and ranging accuracy can be improved.

Figure 15:
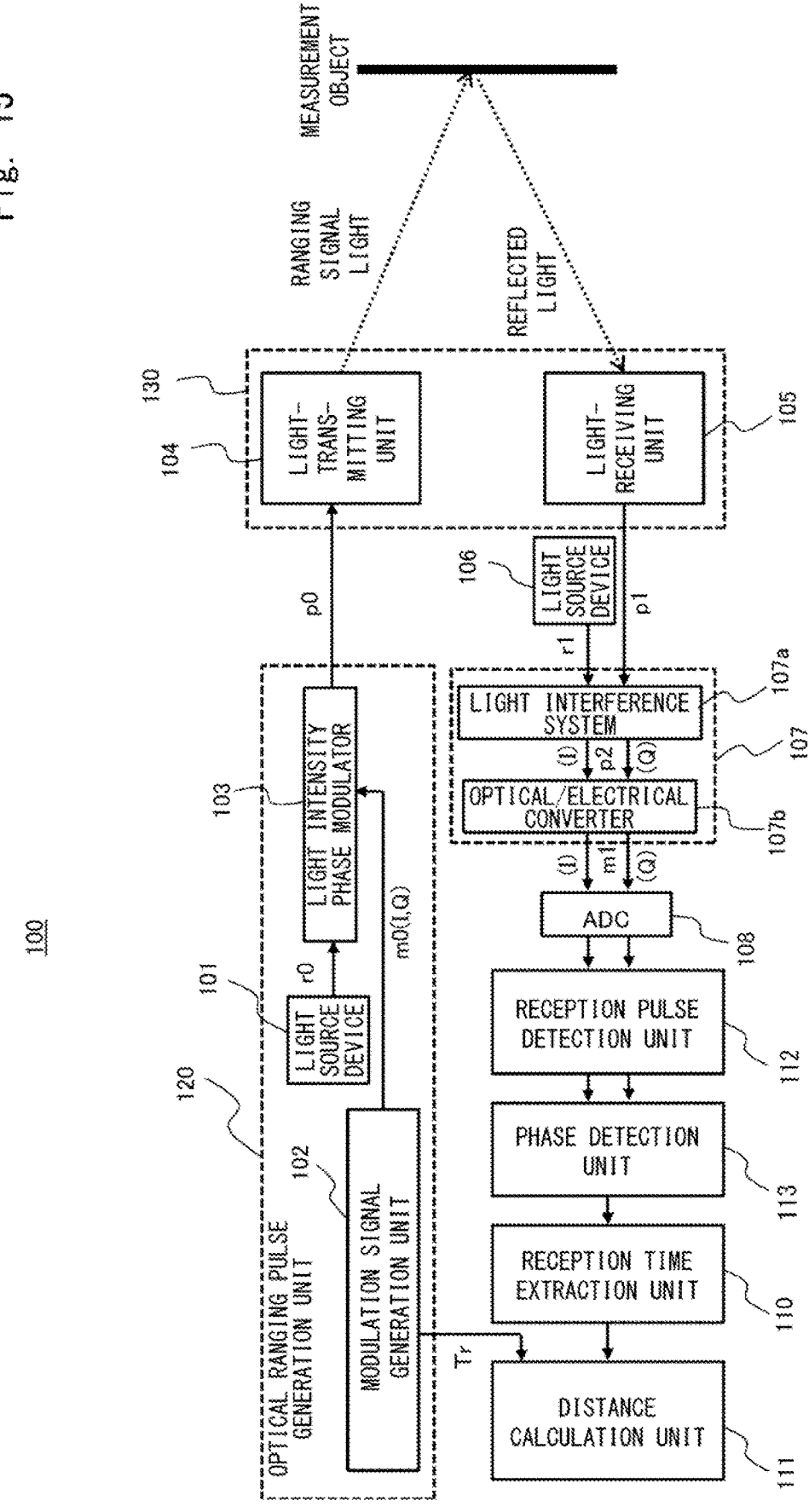
FIG. 15 is a configuration diagram illustrating a configuration example of an optical ranging device according to the second example embodiment.

FIG. 15 illustrates a configuration of the optical ranging device according to the present example embodiment. As illustrated in FIG. 15, an optical ranging device 100 according to the present example embodiment includes a light source device 101, a modulation signal generation unit 102, a light intensity phase modulator 103, a light-transmitting unit 104, a light-receiving unit 105, a light source device 106, a coherent IQ optical receiver 107, an ADC 108, a reception time extraction unit 110, and a distance calculation unit 111, as in the first example embodiment, and includes a reception pulse detection unit 112 and a phase detection unit 113 instead of the phase difference extraction unit 109 in the first example embodiment.

In the present example embodiment, the light intensity phase modulator 103 applies a monotonically increasing or monotonically decreasing phase modulation to a light source r0 based on phase modulation signals m0 (I, Q) and generates a transmission optical signal p0 including the transmission light pulse. The light intensity phase modulator 103 is, for example, an MZ type IQ optical modulator.

Figure 16:
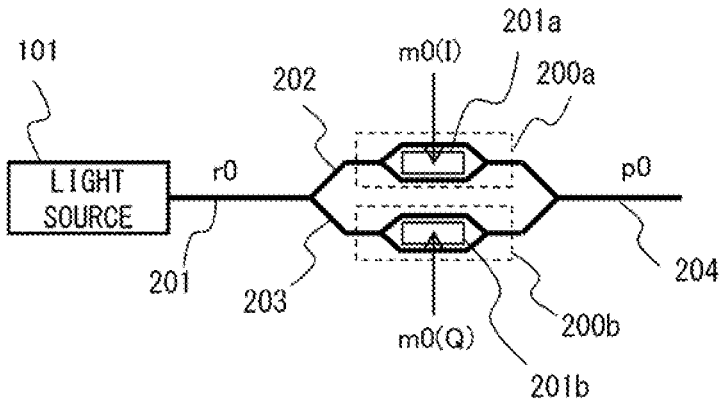
FIG. 16 is a configuration diagram illustrating a configuration example of an optical phase modulator according to the second example embodiment.

FIG. 16 illustrates an example of the light intensity phase modulator 103 according to the present example embodiment. For example, the light intensity phase modulator 103 is an MZ type IQ optical modulator, and an optical modulation unit 200a and an optical modulation unit 200b are arranged in parallel between an input optical waveguide 201 and an output optical waveguide 204. The optical modulation unit 200a and the optical modulation unit 200b are MZ type optical modulators.

The optical modulation unit 200a is a phase modulation unit that applies phase modulation in an in-phase direction. The optical modulation unit 200a has a phase modulation electrode 201a, and applies phase modulation on an input optical signal on a positive side or a negative side in the in-phase direction according to a voltage of the phase modulation signal m0(I) to be input to the phase modulation electrode 201a. The optical modulation unit 200b is a phase modulation unit that applies phase modulation in a quadrature direction. The optical modulation unit 200b has a phase modulation electrode 201b, and applies phase modulation on the input optical signal in the positive side or the negative side in the quadrature direction according to a voltage of the phase modulation signal m0(Q) to be input to the phase modulation electrode 201b. By multiplexing the optical signal phase-modulated in the in-phase direction by the optical modulation unit 200a and the optical signal phase-modulated in the quadrature direction by the optical modulation unit 200b, an optical signal modulated in any phase can be generated. For example, when an optical signal (r0) of $\exp(j2\pi f_0 t)$ is input, and a phase modulation signal m0(I) of $\cos(2\pi f_1 t)$ and a phase modulation signal m0(Q) of $\sin(2\pi f_1 t)$ are input, an optical signal (p0) of $\exp\{j2\pi(f_0 + f_1)t\}$ is output.

In FIG. 15, a reception pulse detection unit (light pulse extraction unit) 112 extracts only a reception light pulse portion of the reception signal, based on the light intensity of an IQ reception signal m1 subjected to AD conversion. The phase detection unit 113 detects the phase of the reception light pulse from the extracted signal. The reception time extraction unit (phase change point detection unit) 110 detects a phase change point at which the detected phase of the reception light pulse is switched from a monotonic increase to a monotonic decrease, and extracts a time thereof.

Figure 17:
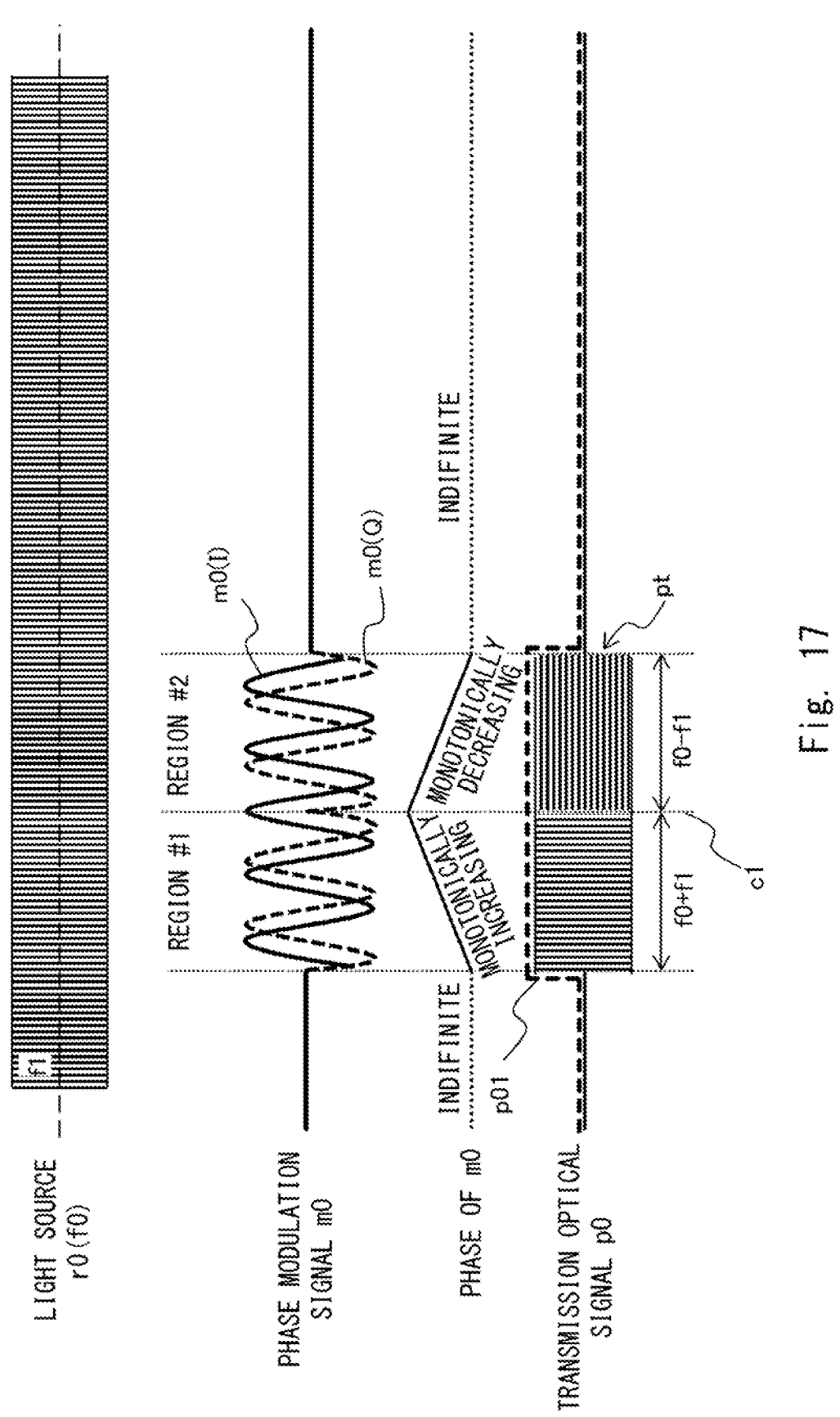
FIG. 17 is a timing chart illustrating a transmission signal according to the second example embodiment.

FIG. 17 illustrates a specific example of a signal on the transmission side in the optical ranging device 100 of FIG. 15. As illustrated in FIG. 17, the light source device 101 on the transmission side generates a light source r0 having an optical frequency f0, similarly to the first example embodiment.

As illustrated in FIG. 17, the modulation signal generation unit 102 generates phase modulation signals m0(I) and m0(Q) for modulating the regions #1 and #2 in such a way that their phase inclinations are different from each other. For example, in the region #1, the phase of the phase modulation signal m0(I) and the phase of the phase modulation signal m0(Q) are shifted by 90°. Stated differently, the phase modulation signal m0(Q) is delayed in phase by 90° with respect to the phase modulation signal m0(I). In the region #2, the phase of the phase modulation signal m0(I) is the same as that of the region #1, and the phase of the phase modulation signal m0(Q) is inverted from that of the region #1 (shifted by 180°). Stated differently, the phase modulation signal m0(Q) is advanced in phase by 90° with respect to the phase modulation signal m0(I). Then, as illustrated in FIG. 17, the phase of the phase modulation signal m0 monotonically increases with time in the region #1 and monotonically decreases with time in the region #2. The phase monotonically increases (or increases) with time or monotonically decreases (or decreases) with time means that the phase monotonically increases (or increases) with time or monotonically decreases (or decreases) with time with respect to the phase of the optical signal of the light source r0 as a reference. Note that portions other than the region #1 and the region #2 are extinguished, and the phase is indefinite.

Figure 18:
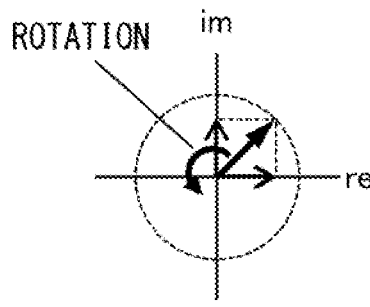
FIG. 18 is a diagram illustrating a phase vector of a transmission signal according to the second example embodiment.
Figure 19:
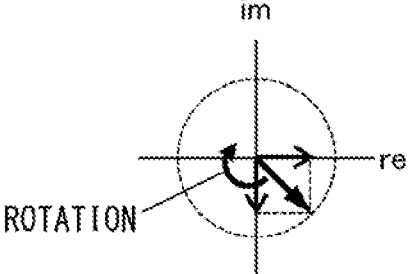
FIG. 19 is a diagram illustrating a phase vector of a transmission signal according to the second example embodiment.

For example, when the phase modulation signals m0(I) and m0(Q) are input to the optical modulation units 200a and 200b of the light intensity phase modulator 103 of FIG. 16, a transmission light pulse pt as illustrated in FIG. 17 is generated. The portion of the region #1 of the generated transmission light pulse pt becomes an optical signal whose phase monotonically increases by the phase modulation signals m0(I) and m0(Q), and a frequency of this optical signal becomes f0+f1 acquired by adding the frequency offset f1 to the frequency f0 of the reference light. As in FIG. 18, a phase vector of the region #1 is a vector that rotates counterclockwise with time on a complex plane by the phases of the phase modulation signals m0(I) and m0(Q), in other words, by a frequency offset (+f1). Further, a portion of the region #2 of the transmission light pulse pt becomes an optical signal whose phase monotonically decreases by the phase modulation signals m0(I) and m0(Q), and the frequency of this optical signal becomes f0−f1 acquired by subtracting the frequency offset f1 from the frequency f0 of the reference light. As in FIG. 19, the phase vector of the region #2 is a vector that rotates clockwise with time on the complex plane by the phases of the phase modulation signals m0(I) and m0(Q), in other words, by a frequency offset (−f1).

Figure 20:
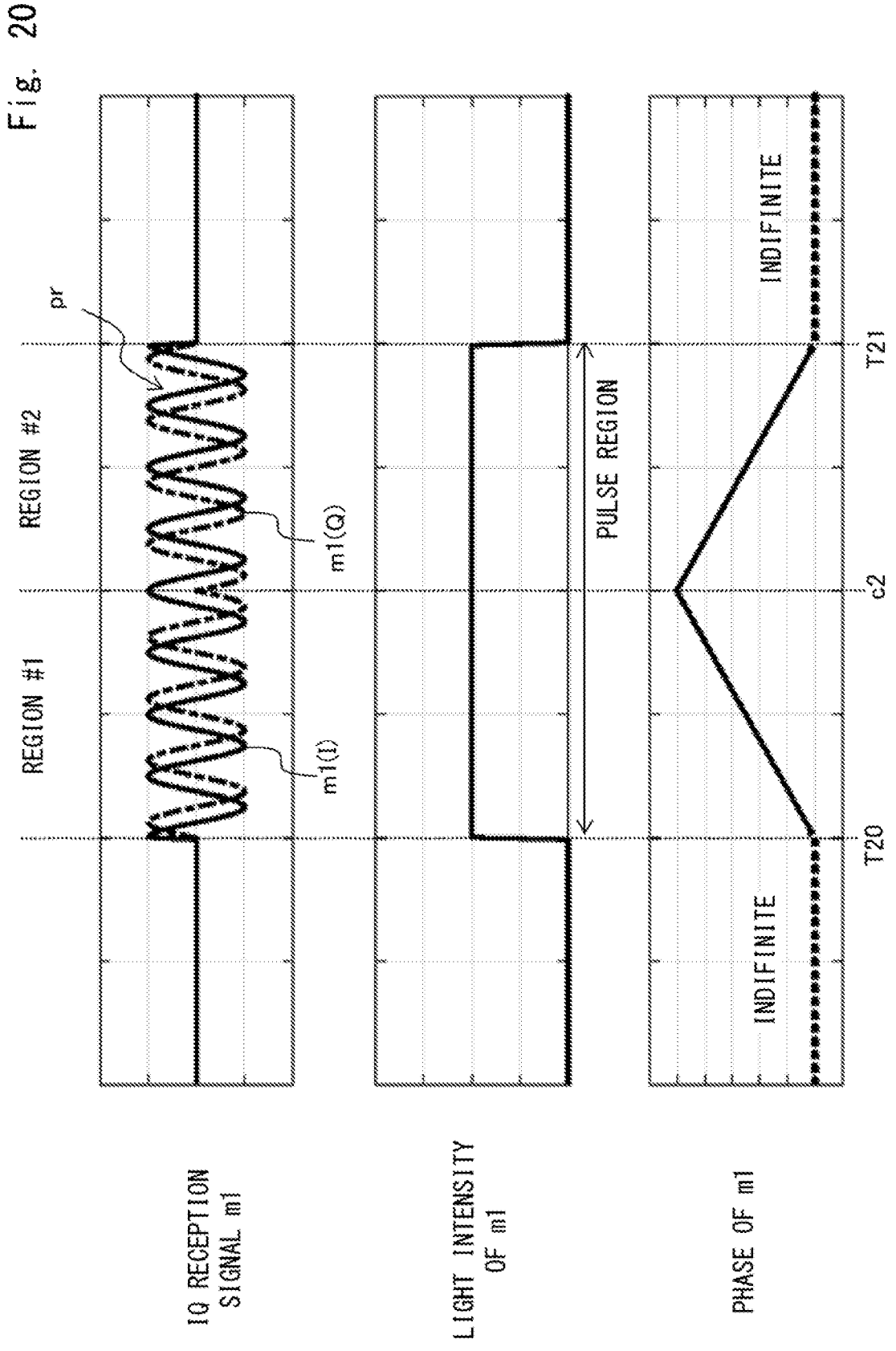
FIG. 20 is a timing chart illustrating a reception signal according to the second example embodiment.
Figure 21:
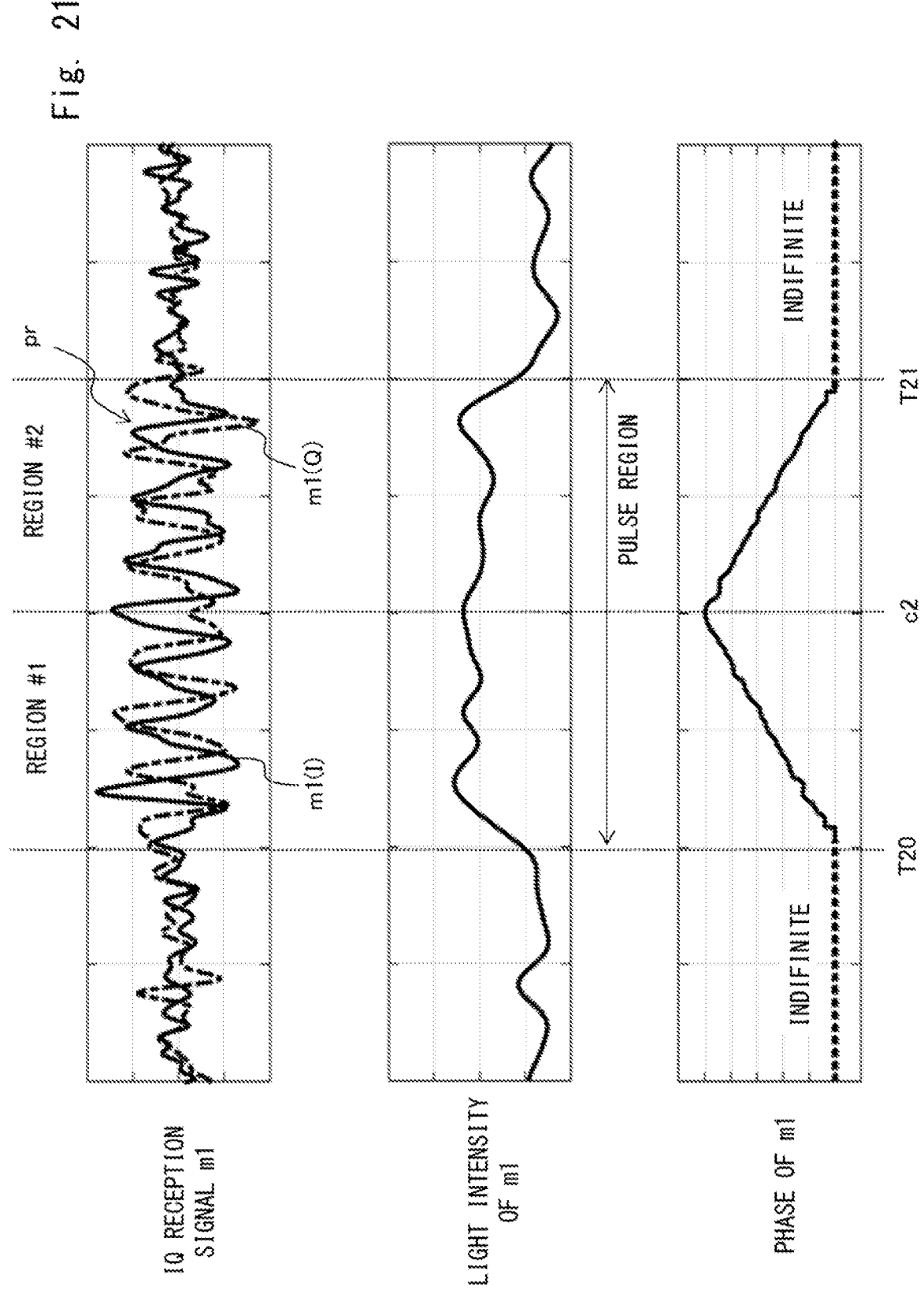
FIG. 21 is a timing chart illustrating a reception signal according to the second example embodiment.
Figure 22:
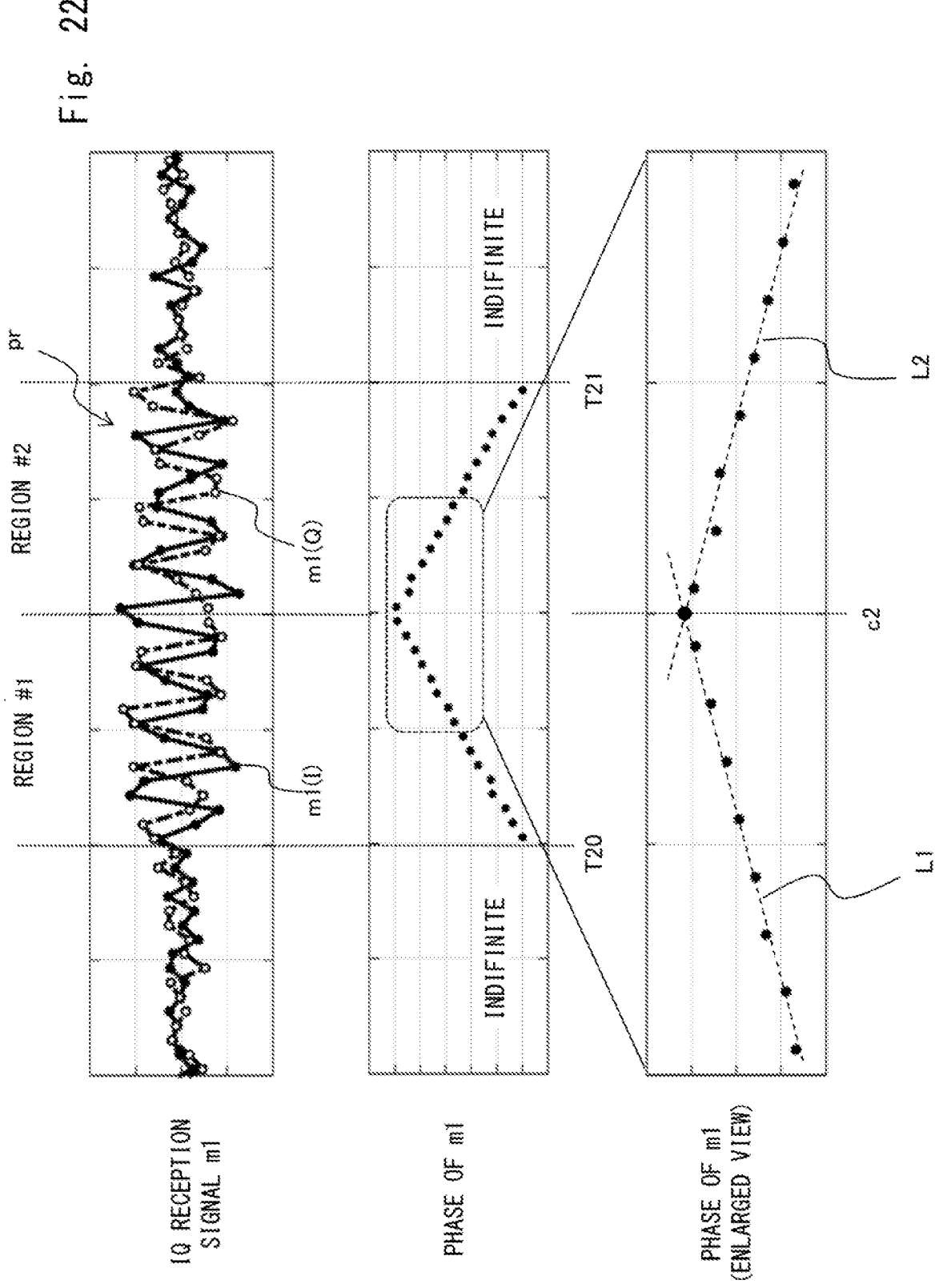
FIG. 22 is a timing chart illustrating a reception signal according to the second example embodiment.

FIGS. 20 to 22 illustrate specific examples of signals on the reception side in the optical ranging device 100 of FIG. 15. FIG. 20 is an example of an ideal reception signal. As illustrated in FIG. 20, the ideal reception signal has the same waveform as that of the transmission side illustrated in FIG. 17. Also herein, as described in the first example embodiment, the same signal as that of the transmitting side is demodulated on the reception side, based on the principle of the coherent IQ optical receiver used in the digital coherent optical communication.

Therefore, ideally, the IQ reception signals m1(I) and m1(Q) output from the coherent IQ optical receiver 107 have the same waveforms as the phase modulation signals m0(I) and m0(Q) on the transmitting side. In other words, as for the reception light pulse pr, similarly to the transmission light pulse pt, in the region #1, the IQ reception signal m1(Q) is shifted by 90° from the IQ reception signal m1(I), and in the region #2, the IQ reception signal m1(I) is in phase with the region #1, and the IQ reception signal m1(Q) is inverted from the region #1. In other words, in the region #1, the IQ reception signal m1(Q) is a signal delayed in phase by 90° with respect to the IQ reception signal m1(I), and in the region #2, the IQ reception signal m1(Q) is a signal advanced in phase by 90° with respect to the IQ reception signal m1(I).

As illustrated in FIG. 20, the light intensity of the IQ reception signal m1 has a pulse waveform of a constant level from times T20 to T21, and the reception pulse detection unit 112 detects a pulse region from the times T20 to T21 by detecting a range exceeding a predetermined threshold value. As in FIG. 20, the phase detection unit 113 detects the phase of the IQ reception signal m1 in a range from the times T20 to T21 of the detected pulse region. The detected phase monotonically increases with time in the region #1 and monotonically decreases with time in the region #2, as in the transmission side. The reception time extraction unit 110 detects a phase change point c2, based on a change in the phase (a change in inclination) of the IQ reception signal m1. In this example, a point at which the phase is switched from monotonically increasing to monotonically decreasing is detected as the phase change point c2. In addition, the reception time extraction unit 110 may detect a vertex (maximum value) having the largest phase as a phase change point. For example, when the phase of the region #1 monotonically decreases and the phase of the region #2 monotonically increases, a vertex (minimum value) having the smallest phase may be detected as the phase change point.

FIG. 21 is an example of a reception signal actually received. As illustrated in FIG. 21, the waveform of the actual reception signal is disturbed because the pulse shape is fixed or noise is superimposed on the ideal reception signal of FIG. 20.

In other words, the IQ reception signals m1(I) and m1(Q) are generally disturbed compared to the ideal signal. As illustrated in FIG. 21, the light intensity of the IQ reception signal m1 has a waveform that is upwardly and downwardly disturbed, but it is possible to detect the pulse region from the times T20 to T21 by a predetermined threshold value. When the phase of the IQ reception signal m1 is detected in the range from the times T20 to T21, the phase monotonically increases in the region #1 and monotonically decreases in the region #2, while slightly fluctuating. As described above, although the light intensity of the actual reception signal is greatly disturbed, the phase information is resistant to noise and has little disturbance, and therefore, the phase change point c2 can be detected with high accuracy.

FIG. 22 is an example of a sampling signal acquired by performing AD conversion on the actual reception signal illustrated in FIG. 21. As illustrated in FIG. 22, when the actual IQ reception signal m1 is AD-converted by the ADC 108, sampling becomes time discrete, and therefore, discrete data are generated for each sampling interval. Then, as illustrated in FIG. 22, the phase detected by the phase detection unit 113 from the IQ reception signal m1 also has a discrete value, and therefore, the phase change point (phase switching point) cannot be accurately determined in some cases. Therefore, as illustrated in the enlarged view of FIG. 22, the reception time extraction unit 110 derives an approximate straight line L1 (first approximate line) approximating an inclination of the monotonically increasing phase and an approximate straight line L2 (second approximate line) approximating an inclination of the monotonically decreasing phase from phase data of the monotonically increasing region (region #1) and the monotonically decreasing region (region #2). The original phase change point c2 is estimated by extrapolating the approximate straight lines L1 and L2 and finding the intersection point. As a result, even when there is no sampling point at the phase change point c2, the phase change point c2 can be estimated, and therefore, the influence of the phase information due to noise can be suppressed. The approximate line to be extrapolated is not limited to a straight line, and may include a curve or may be bent in the middle.

As described above, in the present example embodiment, the phase change point of the reception light pulse can be detected with high accuracy by applying phase modulation to the transmission light pulse by the monotonically increasing phase and the monotonically decreasing phase. In addition, even in a case of a discrete sampling reception signal, the arrival time can be measured with time accuracy equal to or less than the sampling time, and the ranging accuracy can be improved.

Third Example Embodiment

Figure 23:
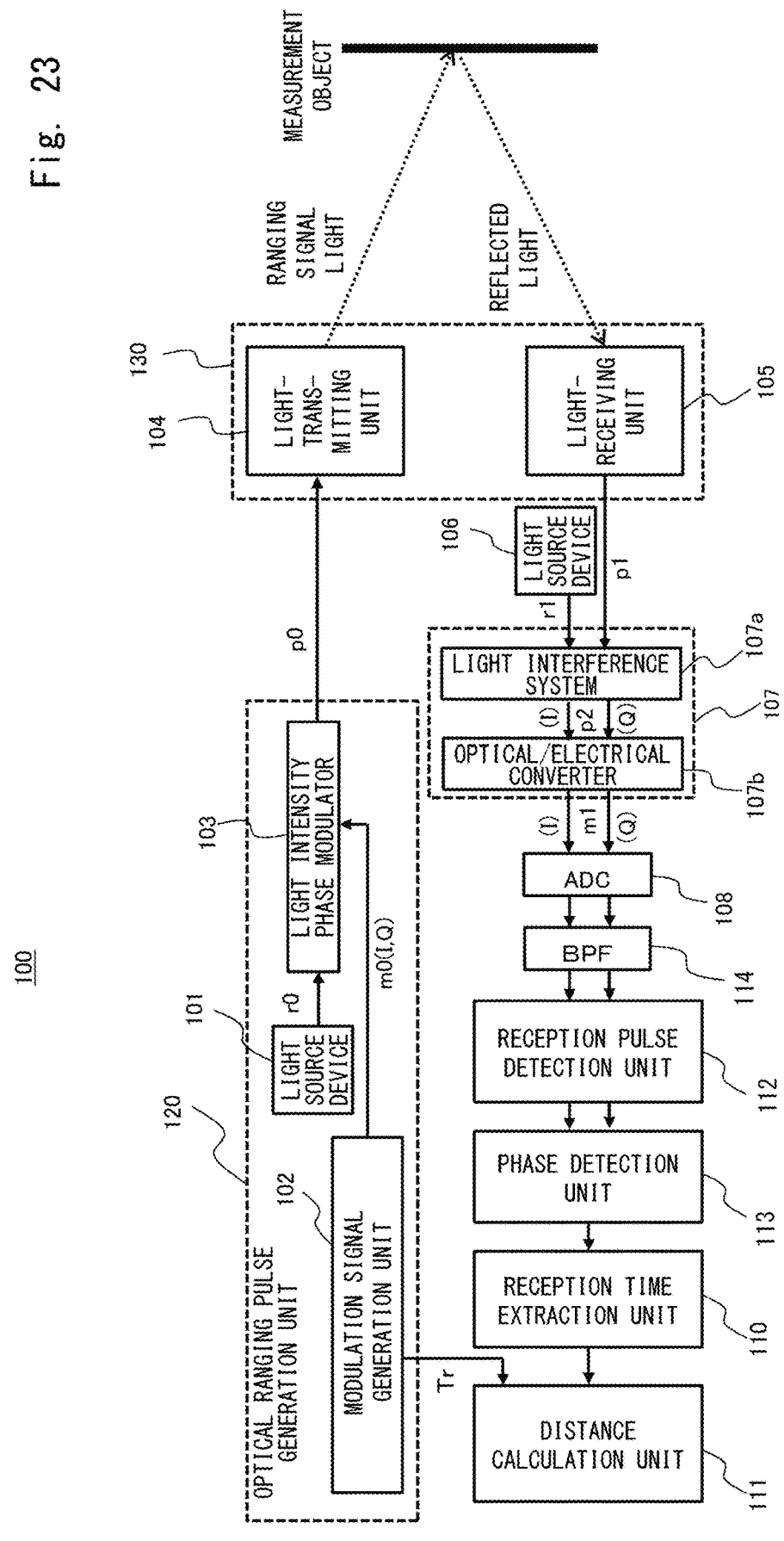
FIG. 23 is a configuration diagram illustrating a configuration example of an optical ranging device according to a third example embodiment.

A third example embodiment further describes a specific example in the second example embodiment. FIG. 23 illustrates a configuration example of an optical ranging device according to the present example embodiment. For example, as illustrated in FIG. 23, an optical ranging device 100 may include a BPF 114 as necessary in addition to the configuration of the second example embodiment. The BPF 114 is a noise removal filter for removing noise of an IQ reception signal.

Figure 24:
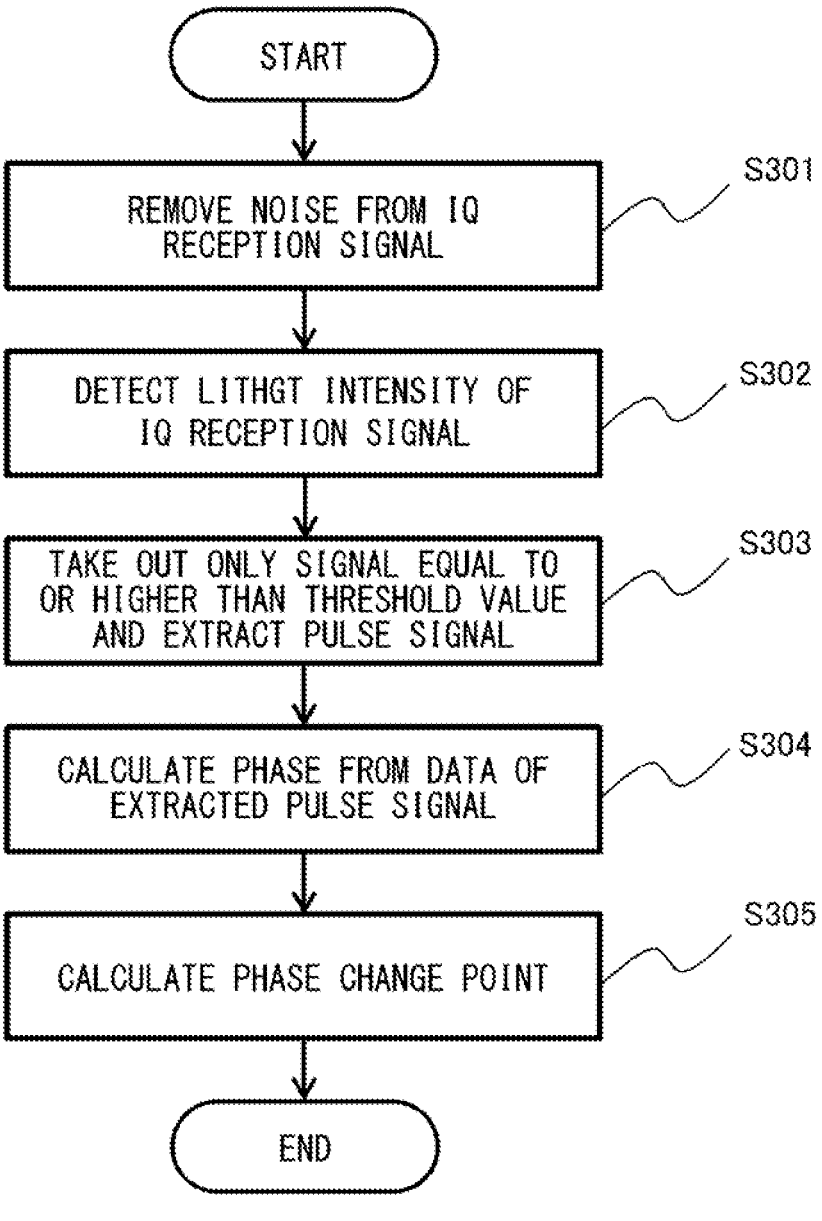
FIG. 24 is a flowchart illustrating a phase change point detection method according to the third example embodiment.
Figure 25:
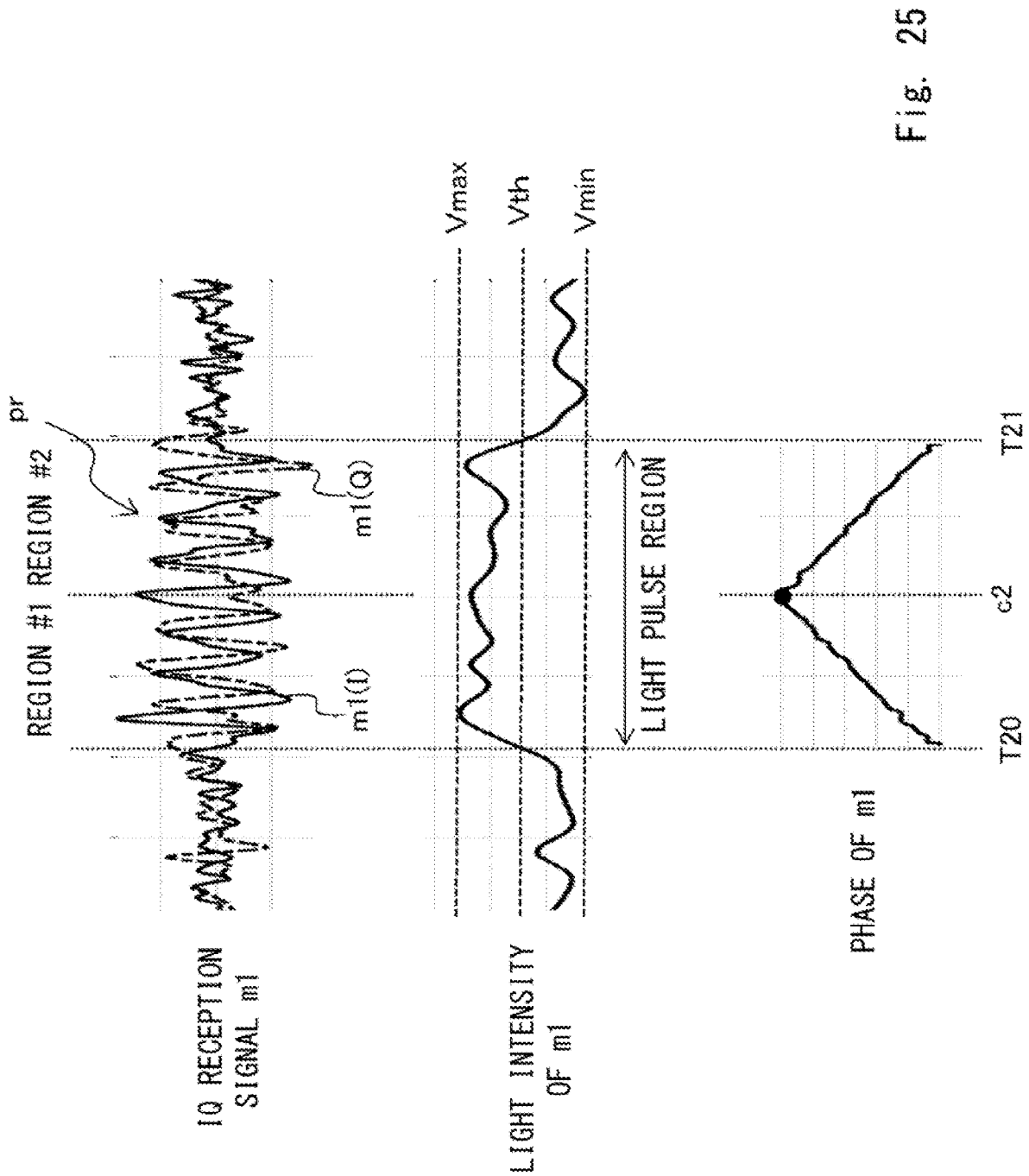
FIG. 25 is a timing chart illustrating a reception signal according to the third example embodiment.

FIG. 24 illustrates a specific extraction flow of a phase change point on a reception side of the optical ranging device according to the present example embodiment, and FIG. 25 illustrates an example of the reception signal. As illustrated in FIG. 24, when a coherent IQ optical receiver 107 (and an ADC 108) outputs an IQ reception signal m1 as illustrated in FIG. 25, the BPF 114 removes noise of the IQ reception signal m1 as necessary (S301).

Subsequently, the reception pulse detection unit 112 detects a light intensity of the IQ reception signal m1 from which the noise has been removed (S302), and the reception pulse detection unit 112 takes out only the signal whose light intensity is equal to or higher than a threshold value and extracts the pulse signal (S303). As illustrated in FIG. 25, the reception pulse detection unit 112 generates a light intensity signal indicating an envelope of the IQ reception signal m1. In addition, the reception pulse detection unit 112 detects times T20 to T21 at which the light intensity is equal to or higher than a threshold value Vth as a light pulse region, and extracts only a signal in the light pulse region. For example, (Vmax+Vmin)/2 is set to the threshold value Vth with the maximum value of the light intensity being Vmax and the minimum value being Vmin.

Subsequently, the phase detection unit 113 calculates a phase of the reception light pulse from data of the extracted pulse signal (S304), and the reception time extraction unit 110 calculates a phase change point of the reception light pulse, based on the phase (S305). As illustrated in FIG. 25, the phase detection unit 113 acquires the phase of the IQ reception signal m1 from the times T20 to T21 of the detected light pulse region. The reception time extraction unit 110 calculates a phase change point (phase switching point), based on the phase of the IQ reception signal m1. As described above, the reception time extraction unit 110 acquires the phase change point c2 by approximate straight line extrapolation or the like.

Fourth Example Embodiment

Figure 26:
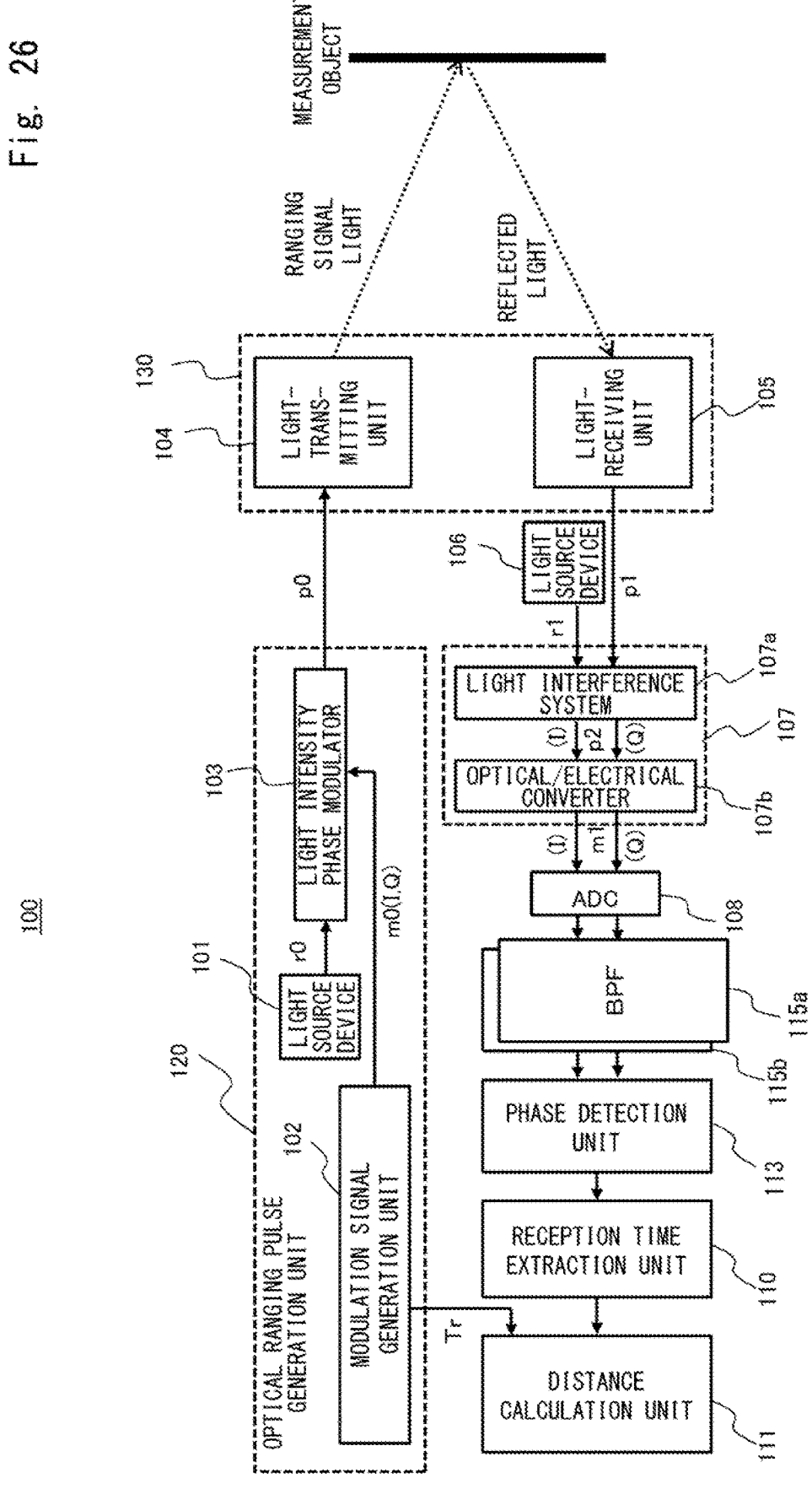
FIG. 26 is a configuration diagram illustrating a configuration example of an optical ranging device according to a fourth example embodiment.

In a fourth example embodiment, an example of extracting a light pulse region by still another method in the second example embodiment will be described. FIG. 26 illustrates a configuration example of an optical ranging device according to the present example embodiment. As illustrated in FIG. 26, the optical ranging device 100 may include a BPF 115a and a BPF 115b that extract a light pulse, instead of the reception pulse detection unit 112 of the second example embodiment. For example, the BPF 115a is a filter for extracting a signal having a positive frequency offset included in a light pulse, and the BPF 115a is a filter for extracting a signal having a negative frequency offset included in a light pulse. In other words, the BPF 115a and the BPF 115b extract a signal having a positive frequency offset and a signal having a negative frequency offset from a reception signal, and extract signals in the regions #1 and #2 of the light pulse.

Figure 27:
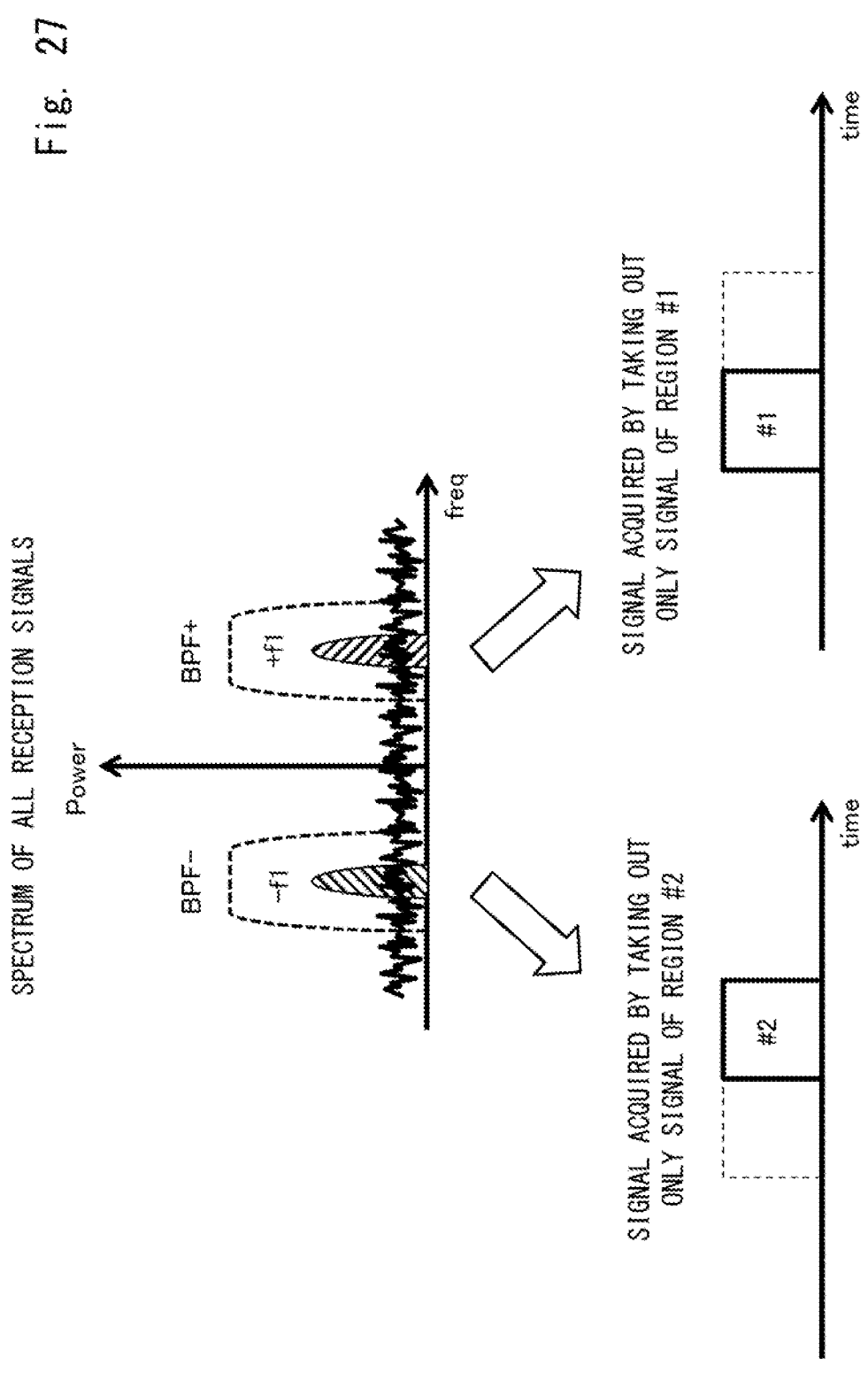
FIG. 27 is a diagram for explaining a light pulse extraction method according to the fourth example embodiment.

As illustrated in FIG. 27, a frequency characteristic of the reception signal (IQ reception signal) has peaks in bands of a positive frequency offset (+f1) and a negative frequency offset (−f1). Therefore, the BPF 115a extracts a signal in the positive frequency offset (+f1) band, and outputs only the signal in the region #1. The BPF 115b extracts a signal in the negative frequency offset (−f1) band, and outputs only the signal in the region #2. Thereafter, as in the second and third example embodiments, the phase detection unit 113 detects phases of the extracted region #1 and region #2, and the reception time extraction unit 110 detects a phase change point.

Another Example Embodiment

Figure 28:
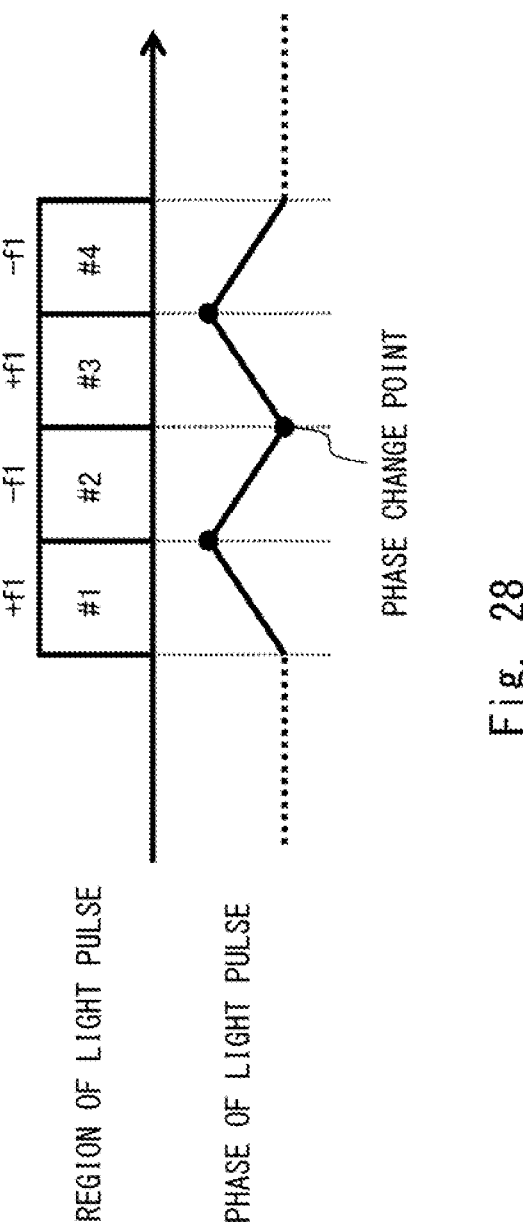
FIG. 28 is a diagram illustrating an example of a change in light pulse and phase according to another example embodiment.

The present disclosure is not limited to the above-described example embodiments, and can be appropriately changed within a range not deviating from the gist. For example, in the above example embodiment, an example in which a light pulse is divided into a first half portion and a second half portion has been described, but the present invention is not limited thereto. For example, the light pulse may be divided into N regions, and a phase change point (N−1) between the regions may be detected. By averaging a timing of each phase change point, an arrival time can be measured more accurately. In an example of FIG. 28, the light pulse is divided into four regions #1 to #4, three phase change points between the regions #1 to #4 are extracted, and the timing of the phase change point is averaged.

Figure 29:
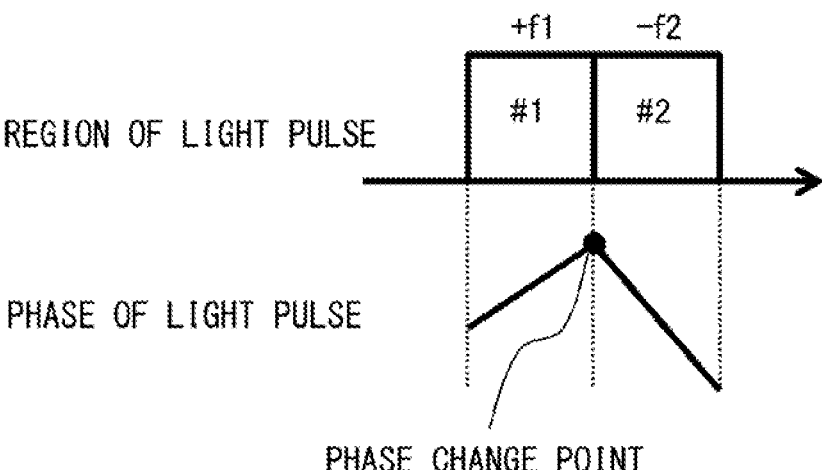
FIG. 29 is a diagram illustrating an example of a change in light pulse and phase according to another example embodiment.
Figure 30:
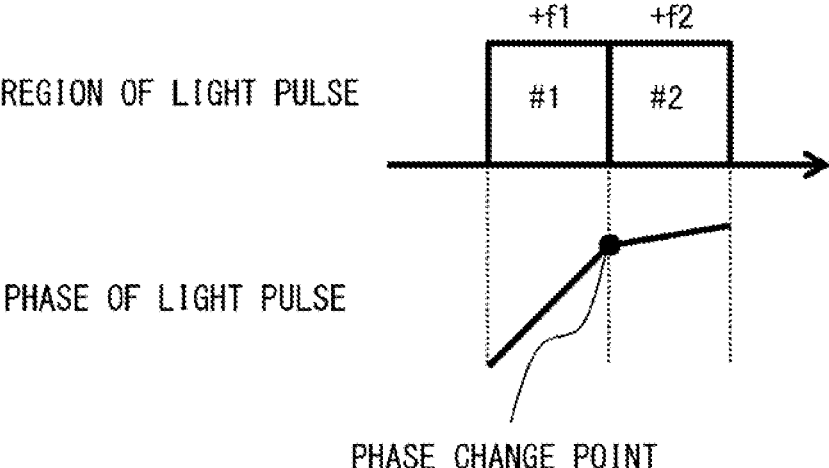
FIG. 30 is a diagram illustrating an example of a change in light pulse and phase according to another example embodiment.

In addition, although a phase of the region #1 of the light pulse is monotonically increased and a phase of the region #2 is monotonically decreased, the present invention is not limited thereto. One of the phases of the region #1 and the region #2 may increase (e.g., monotonically increase) with time, and another phase may decrease (e.g., monotonically decrease) with time. Furthermore, a frequency offset (phase inclination) of the light pulse may be asymmetric in the two regions. In the example of FIG. 29, a frequency offset of the region #1 is set to (+f1) and a frequency offset of the region #2 is set to (−f2), and the inclination in which the phase decreases in the region #2 is larger than the inclination in which the phase increases in the region #1. Further, in the example of FIG. 30, the frequency offset of the region #1 is set to (+f1) and the frequency offset of the region #2 is set to (+f2), and the inclination in which the phase increases in the region #2 is smaller than the inclination in which the phase increases in the region #1. In other words, the inclinations (frequency offsets) of the phases of the region #1 and the region #2 may be different, or directions of inclinations (positive/negative of the frequency offset) of the phases may be the same. For example, the phases of both the region #1 and the region #2 may increase (e.g., monotonically increase) or decrease (e.g., monotonically decrease) with time.

By making the frequency offsets asymmetric in the two regions, a signal for each region can be easily separated by a band-pass filter or the like, and the pulse signal can be easily extracted. Further, when the frequency offsets are (+f1) and (+f2) as in FIG. 30, only a signal of the I component may be received, and therefore, a circuit scale on a reception side can be reduced by half.

Although the present disclosure has been described above with reference to the example embodiments, the present disclosure is not limited to the above example embodiments. Various modifications may be made to the structure and details of the present disclosure as will be understood by those skilled in the art within the scope of the present disclosure.

REFERENCE SIGNS LIST

10 Optical ranging device
11 Light pulse generation unit
12 Light-transmitting unit
13 Light-receiving unit
14 Distance calculation unit
100 Optical ranging device
101 Light source device
102 Modulation signal generation unit
103 Light intensity phase modulator
104 Light-transmitting unit
105 Light-receiving unit
106 Light source device
107 Coherent IQ optical receiver
107a Optical interference system
107b Optical/electrical converter
108 ADC
109 Phase difference extraction unit
110 Reception time extraction unit
111 Distance calculation unit
112 Received pulse detection unit
113 Phase detection unit
120 Optical ranging pulse generation unit
130 Light-transmitting/receiving block
131 Light-transmitting/receiving unit
132 Circulator
200a, 200b Optical modulation unit
201 Input optical waveguide
201a, 201b Phase modulation electrode
202, 203 Arm
204 Output optical waveguide
205 Phase modulation electrode
m0 Phase modulation signal
m1 IQ reception signal
p0 Transmission optical signal
p1 Reception optical signal
p2 Interference optical signal
r0 Light source
r1 Reference light

What is claimed is:

1. An optical ranging device comprising:
a light pulse generator configured to generate a light pulse with a phase change point between a first phase modulation portion and a second phase modulation portion;
a light-transmitter configured to transmit the generated light pulse;
a light-receiver configured to receive a light pulse reflected from a measurement object by the transmitted light pulse; and
a distance calculator configured to calculate a distance to the measurement object, based on a phase change point of the transmitted light pulse and a phase change point of the received light pulse,
wherein a phase of the first phase modulation portion changes with a first inclination with respect to time, and
a phase of the second phase modulation portion changes with a second inclination different from the first inclination with respect to time.

2. The optical ranging device according to claim 1, wherein an optical signal of the first phase modulation portion is a first phase and an optical signal of the second phase modulation portion is a second phase different from the first phase.

3. The optical ranging device according to claim 2, wherein an optical signal of the second phase modulation portion is a signal acquired by inverting a phase of an optical signal of the first phase modulation portion.

4. The optical ranging device according to claim 2, further comprising a phase change point detector configured to detect the phase change point by a phase difference between the first phase modulation portion and the second phase modulation portion in the received light pulse.

5. The optical ranging device according to claim 4, further comprising a phase intensity converter configured to convert a phase of the received light pulse into a signal intensity,
wherein the phase change point detector detects the phase change point, based on a change in the signal intensity.

6. The optical ranging device according to claim 1, wherein one phase of the first phase modulation portion and the second phase modulation portion increases with time with respect to a phase of an optical signal of a reference light source, and another phase of the first phase modulation portion and the second phase modulation portion decreases with time with respect to a phase of an optical signal of the reference light source.

7. The optical ranging device according to claim 6, wherein one phase of the first phase modulation portion and the second phase modulation portion monotonically increases with time with respect to a phase of an optical signal of the reference light source, and another phase of the first phase modulation portion and the second phase modulation portion monotonically decreases with time with respect to a phase of an optical signal of the reference light source.

8. The optical ranging device according to claim 7, wherein one phase of the first phase modulation portion and the second phase modulation portion increases with time at a first rate with respect to a phase of an optical signal of the reference light source, and another phase of the first phase modulation portion and the second phase modulation portion decreases with time at a second rate different from the first rate with respect to a phase of an optical signal of the reference light source.

9. The optical ranging device according to claim 1, wherein phases of both the first phase modulation portion and the second phase modulation portion increase or decrease with time with respect to a phase of an optical signal of a reference light source.

10. The optical ranging device according to claim 9, wherein phases of both the first phase modulation portion and the second phase modulation portion monotonically increase or monotonically decrease with time with respect to a phase of an optical signal of the reference light source.

11. The optical ranging device according to claim 1, wherein a frequency of the first phase modulation portion has a first frequency offset with respect to a reference frequency as a reference, and a frequency of the second phase modulation portion has a second frequency offset with respect to the reference frequency.

12. The optical ranging device according to claim 1, further comprising a phase change point detector configured to detect the phase change point, based on a maximum value or a minimum value of a phase in the received light pulse.

13. The optical ranging device according to claim 1, further comprising a phase change point detector configured to detect the phase change point, based on a change in inclination of a phase with respect to time in the received light pulse.

14. The optical ranging device according to claim 13, wherein the phase change point detector detects the phase change point, based on a first approximate line that approximates an inclination of a phase of the first phase modulation portion in the received light pulse and a second approximate line that approximates an inclination of a phase of the second phase modulation portion in the received light pulse.

15. The optical ranging device according to claim 14, wherein the first approximate line and the second approximate line are approximate straight lines.

16. The optical ranging device according to claim 14, wherein the phase change point detector detects an intersection of the first approximate line and the second approximate line as the phase change point.

17. The optical ranging device according to claim 1, further comprising a light pulse extractor configured to extract the light pulse from the optical signal, based on a light intensity of an optical signal to be received by the light-receiver.

18. The optical ranging device according to claim 11, further comprising a light pulse extractor configured to extract a signal with a frequency of the first frequency offset and a signal with a frequency of the second frequency offset from an optical signal to be received by the light-receiver.

19. An optical ranging method comprising:
generating a light pulse with a phase change point between a first phase modulation portion and a second phase modulation portion;
transmitting the generated light pulse;
receiving a light pulse reflected from a measurement object by the transmitted light pulse; and
calculating a distance to the measurement object, based on a phase change point of the transmitted light pulse and a phase change point of the received light pulse,
wherein a phase of the first phase modulation portion changes with a first inclination with respect to time, and
a phase of the second phase modulation portion changes with a second inclination different from the first inclination with respect to time.

\* \* \* \* \*